(12) United States Patent
Takahashi et al.

(10) Patent No.: US 6,449,352 B1
(45) Date of Patent: Sep. 10, 2002

(54) PACKET GENERATING METHOD, DATA MULTIPLEXING METHOD USING THE SAME, AND APPARATUS FOR CODING AND DECODING OF THE TRANSMISSION DATA

(75) Inventors: Toshiya Takahashi, Takatsuki; Yoshinori Matsui, Katano, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/666,784

(22) Filed: Jun. 19, 1996

(30) Foreign Application Priority Data

Jun. 20, 1995 (JP) .............................. 7-152874
Nov. 1, 1995 (JP) .............................. 7-284774

(51) Int. Cl.⁷ .......................... H04M 1/64; H04M 1/56; H04M 11/00; H04M 7/00
(52) U.S. Cl. .............. 379/142.16; 379/671; 379/88.13; 379/88.22; 379/114.29; 379/219; 379/221.02; 379/102.03
(58) Field of Search ................................ 370/352, 353, 370/380, 389, 392, 396, 401, 404, 427, 435, 450, 465, 485; 379/88.13, 90.01, 93.01, 93.05, 93.09, 100.15, 100.16, 67.1, 88.12, 88.22, 102.03, 201.01, 142.16, 114.29, 221.02, 219; 375/222, 240, 240.26, 240.28; 348/845.1–845.3, 423, 465, 467; 725/38, 131–132, 139–140, 151, 152, 168.37

(56) References Cited

U.S. PATENT DOCUMENTS 5,323,188 A  * 6/1994 Kawayachi et al. ........ 348/412
5,329,375 A  * 7/1994 Juri et al. .................... 358/343
5,400,077 A  * 3/1995 Cookson et al. ............ 348/356
5,473,380 A  * 12/1995 Tahara ........................ 348/423
RE35,158 E  * 2/1996 Sugiyama .................... 348/401
5,493,514 A  * 2/1996 Keith et al. .................. 364/514
5,592,586 A  * 1/1997 Maitra et al. ............... 395/2.29
5,617,386 A  * 4/1997 Choi ............................ 369/32
5,623,424 A  * 4/1997 Azadegan et al. ...... 364/514 R
5,634,850 A  * 6/1997 Kitihara et al. ............... 463/33
5,677,905 A  * 10/1997 Bigham et al. ............ 370/94.2
5,684,799 A  * 11/1997 Bigham et al. ............. 370/397
5,699,360 A  * 12/1997 Nishida et al. ............. 370/503
5,740,075 A  * 4/1998 Bigham et al. ............. 364/514
5,818,870 A  * 10/1998 Yaguchi et al. ............. 375/219
5,838,874 A  * 11/1998 Ng et al. ..................... 386/112
5,841,941 A  * 11/1998 Morimoto et al. ........... 386/95

* cited by examiner

Primary Examiner—Allan Hoosain
(74) Attorney, Agent, or Firm—McDermott, Will & Emery

(57) ABSTRACT

The invention relates to a packet generating method for multiplexing one program composed of digital image, digital sound or digital data, or multiplexing and transmitting plural programs, a data multiplexing method using the same, and an apparatus for coding and decoding such transmission data, and the invention further relates to a packet generating method for generating a packet row of digital data, containing a change identifier for identifying change of digital data in the packet row, and multiplexing so that the packet containing this change identifier may be disposed closest to the packet containing the changed digital data, among packets containing various change identifiers in the packet row, a data multiplexing method using the same, and an apparatus for coding and decoding such transmission data.

6 Claims, 22 Drawing Sheets

FIG. 19(a) PRIOR ART
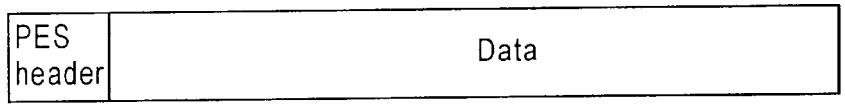
FIG. 19(b) PRIOR ART
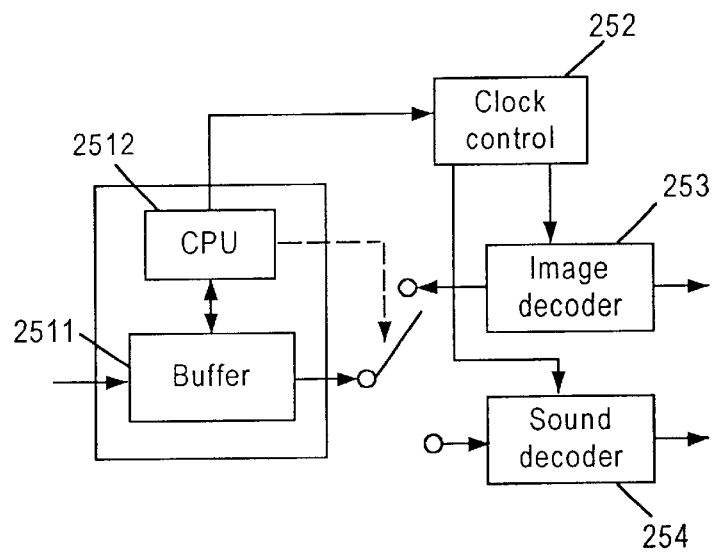
FIG. 25
PRIOR ART

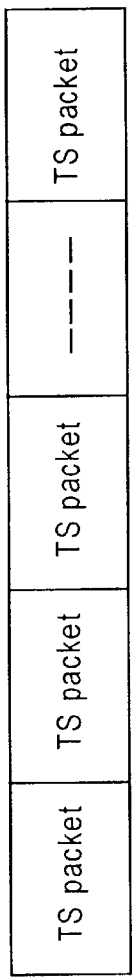
FIG. 21(a)
PRIOR ART
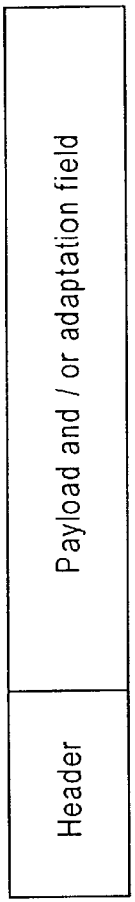
FIG. 21(b)
PRIOR ART
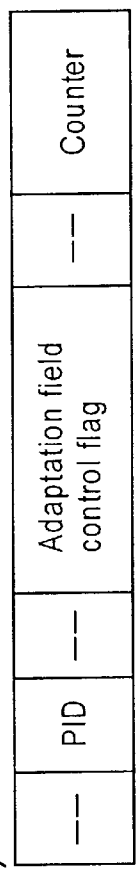
FIG. 21(c)
PRIOR ART
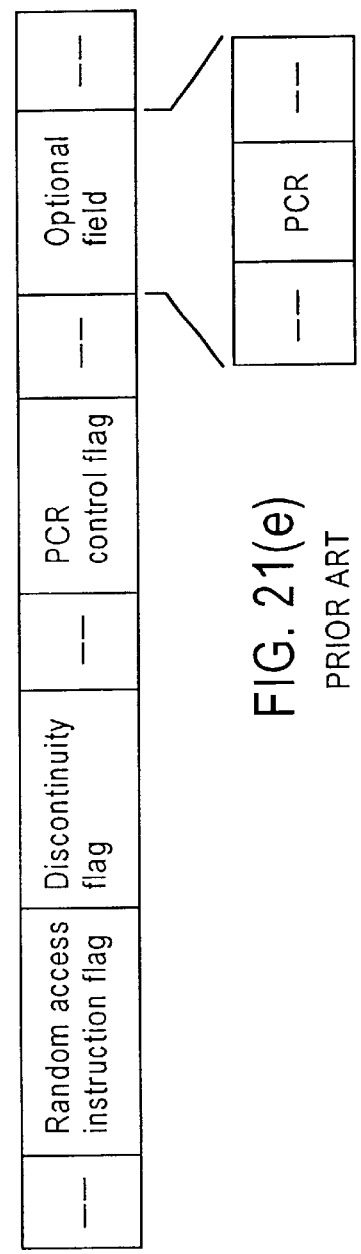
FIG. 21(d)
PRIOR ART
FIG. 21(e)
PRIOR ART FIG. 22(a) PRIOR ART

| — | Program number | — | PCR PID | — | Image PID | — | Sound PID | — |

FIG. 22(b) PRIOR ART

| — | Program number #1 | PMT_PID #1 | Program number #2 | PMT_PID #2 | ... | Program number #N | PMT_PID #N |

PACKET GENERATING METHOD, DATA MULTIPLEXING METHOD USING THE SAME, AND APPARATUS FOR CODING AND DECODING OF THE TRANSMISSION DATA

BACKGROUND OF THE INVENTION

The present invention relates to a packet generating method when transmitting by multiplexing one program composed of digital image, digital sound, digital data or the like, or multiplexing plural programs, a data multiplexing method using the same, and an apparatus for coding and decoding the transmission data.

This packet multiplexing method is also employed in MPEG (Moving Picture Experts Group), an international standard for data compression, and is designed to compress and encode the image data and sound data, in every frame for image or in every specific number of samples such as 1024 for sound (also called frame in the case of sound in MPEG), and generate a packet called PES packet by assembling one frame or plural frames.

FIG. 19 shows an outline of format of PES packet; a PES packet has a header, and the header includes information such as stream ID showing whether the succeeding data area is image data, sound data, or other data, or trick mode flag showing data for trick playback. It also contains a timing signal showing when to decode and reproduce in the frame unit of image data and sound data.

Each PES packet transmits by further dividing into a plurality of 188-byte long TS packets (transport packets) described below.

FIG. 21 shows an outline of format of TS packet. FIG. 21($a$) shows the state of a PES packet divided into plural TS packets to be continuous TS packets.

As shown in FIG. 21($b$), a TS packet is divided into a header, an extension header or adaptation field, and a payload for storing the compressed image or sound data.

The header contains, as shown in FIG. 21($c$), packet identifier PID, adaptation field control flag, and counter. The PID has a same value when data of same sequence is included in the payload. The adaptation field control flag indicates presence or absence of adaptation field and payload. The TS packet includes both or either one of adaptation field and payload. The counter shows the sequence of TS packets having same PID. The counter value is expressed in four bits, and is increased one by one, returning to o after 15.

FIG. 21($d$) is an explanatory diagram of adaptation field, which includes, as shown in the diagram, random access instruction flag showing random access is enabled, discontinuity flag showing the TS packet is discontinuous, and PCR flag showing presence or absence of coding of reference time clock called PCR (program clock reference) necessary when decoding. In MPEG2, the clock frequency of multiplexing apparatus and separating apparatus is specified at 27 MHz, and in order to synchronize the clock of the multiplexing apparatus and separating apparatus, the clock of the multiplexing apparatus is counted at 27 MHz, and the obtained numerical value is sent as PCR. The separating apparatus reproduces the clock synchronized with the multiplexing apparatus from the received PCR. This PCR is not always required to be transmitted, but is transmitted at interval necessary for synchronization of the multiplexing apparatus and separating apparatus, for example, once in about 0.1 sec. Therefore, in the adaptation field, structurally, it may be allowed to be sent or not to be sent as optional field.

Thus constituted image decoder for decoding image data from the packet data is required to detect a special code called sequence start code in the first place. In the TS packet for transmitting image compressed data, when the random access instruction flag is 1, it is clear that the sequence start code is present in the payload.

The discontinuity flag indicates that discontinuity occurs in the value of counter or PCR shown in FIG. 21($c$).

This is description about the packet composition for multiplexing, transmitting or recording image data, sound data, or the like of one program, whereas plural programs can be multiplexed in the TS packet row shown in FIG. 21($a$). An example of such packet row is shown in FIG. 20. In FIG. 20, aside from the packet of image, sound and data, there is also multiplexed a table packet for identifying each program when plural programs are multiplexed. Each packet contains identifier (PID) and counter. Multiplexing of plural programs is described below.

When selecting and decoding one program from the TS packet row containing plural programs, it is necessary to refer to the tables called PMT (program map table) and PAT (program association table) in order to identify and select plural programs.

The PMT is a table showing the PID of TS packet including image and sound data contained in one program as shown in FIG. 22($a$).

The PAT is a table containing the PID of PMT for each program as shown in FIG. 22($b$).

The PMT and PAT are multiplexed in the payload of the TS packet.

FIG. 23 shows an example of packet multiplexing apparatus for multiplexing and transmitting by such conventional MPEG2 multiplexing system, and multiplex data decoding apparatus for reproducing data by separating the input multiplex data. First, the operation of a multiplexing unit 1203 is described. A packet row stored in a first memory device 1201 is put into a first buffer 12031 of the multiplexing unit 1203, and a packet row stored in a second memory device 1202 is put into a second buffer 12032. A table packet is stored in a memory 12033.

A CPU 12033 monitors the buffers 12031, 12032, and tilts a multiplex switch 12035 to the buffer side having input of TS packet, and issues the TS packet. The CPU 12033 also multiplexes and transmits the table packet in the TS packet at a specific interval.

The operation of a separating unit 1204 is described below. An input TS packet is first stored in a buffer 12041. A CPU 12042 operates according to the flowchart shown in FIG. 24, and first receives the PAT and extracts the PID of the TS packet including the PMT of the program to be decoded, and then receives the PMT, and extracts the PID of the PS packet including the image and sound data of a selected program. In the input TS packet, a packet including PCR is sent to a clock control unit 1205, and reproduces reference clock necessary for decoding of image and sound signals. The TS packet including image and sound data is issued into decoders 1206, 1207, respectively through a separation switch 12043. In the decoders 1206, 1207, using the reproduced reference clock, image and sound data is decoded and expanded, and the program is reproduced.

The above international MPEG standard is, for example, ISO/IEC JETC1/SC29/WG11, N801, "ISO/IEC 13818-1 International Standard: INFORMATION TECHNOLOGY—GENERIC CODING OF MOVING PICTURES AND ASSOCIATED AUDIO SYSTEMS," November 1994.

In such constitution alone, however, various problems occur in the decoding apparatus.

First, in the multiplexing apparatus, if the program is skipped halfway and transmitted, in the decoding apparatus, the counter of the TS packet in FIG. 21(c) is discontinuous, and the decoding apparatus recognizes an error when detecting discontinuity of the counter, and the TS packet is discarded, and normal decoding may be disabled.

Or, if sequence start code is included in the image data, the random access instruction flag may not be always set at 1, and hence the separating unit in FIG. 23 must search the image data in order to judge presence or absence of sequence start code. Therefore, the CPU requires high processing capacity, and the multiplex data decoding apparatus may be expensive.

Thus, when decoding one program, since identifier (flag) for processing securely is not disposed in a proper position in the packet row, data discarding, long processing time, or other inconvenience may occur.

When a packet row is fed by multiplexing plural programs, by referring to the table packet in the procedure shown in FIG. 23 as mentioned above, only the packets composing one program can be selected and decoded. However, considering to change a program in the midst of reception in the multiplex data decoding apparatus, it is necessary to analyze by obtaining PAT and PMT again, and it takes a certain time to change the program and display actually.

The multiplexing frequency of PAT and PMT into packet row is not specified in the MPEG standard. Considering such format as television broadcasting, it is impossible to guess the timing of change of program in the multiplex data decoding apparatus, from the transmission side of packet row. It hence requires to multiplex the tables of PAT and PMT in the packet row at a specific frequency. When the multiplexing frequency of these tables is increased, the time required for acquiring the table can be decreased, but the rate of the table occupied in the packet row becomes high, and the transmission rate increases. To the contrary, when the multiplexing frequency of PAT and PMT is decreased, increase of transmission rate can be avoided, but it takes a longer time to acquire the table.

Incidentally, the PCR is discontinuous at the beginning of a program or when the program is changed over, but it is not guaranteed that the discontinuity flag in FIG. 21(d) is at a position showing discontinuity before a discontinuous packet arrives. Therefore, in a worst case, without discontinuity flag, a next discontinuous PCR may arrive, and the decoding apparatus attempts to be synchronized with a completely different PCR, and the operation becomes unstable.

Moreover, if the frame frequency of image or sampling frequency of audio is changed, the output clock from the decoding apparatus must be also changed, but generally a certain time is needed to establish synchronism, and if receiving data differing in sampling frequency, synchronous system may not be established, and the output may be disturbed.

In this way, in the case of decoding of packet row in which plural programs are multiplexed, since the identifier (flag) for processing securely is not disposed at a proper position in the packet row in one program, unstable operation, long processing time, or other inconvenience is likely to occur.

On the other hand, when multiplexing a TS packet of plural programs, it is possible that the TS packet having reference clock PCR may collide at the time of packet multiplexing, and hence the PCR packet interval may fluctuate to jitter. In the decoding apparatus, the reference clock is reproduced by composing a PLL, but the jitter cannot be absorbed when the PCR interval exceeds a certain value, and reproduction of clock is d isabled.

In FIG. 19, meanwhile, there is a trick mode flag in the PES header, and command for fast forward or freeze can be transmitted together with the PES packet, but the operation of the decoding apparatus is not clearly defined, and secure operation is not guaranteed.

Thus the problem is the operation may be unstable because secure instruction signal for reference clock or trick play is not disposed at optimum position in the packet row.

SUMMARY OF THE INVENTION

It is hence a firs t object of the invention to present a packet generating method, a data multiplexing method using the same, and an apparatus for coding and decoding the transmission data, in which a packet row having an identifier disposed optimally for processing, so that the decoding may be processed securely when decoding the packet row, in a packet multiplexing method for transmitting by multiplexing one program composed of digital image, digital sound, and digital data, or multiplexing plural programs.

It is a second object of the invention to present a packet generating method, a data multiplexing method using the same, and an apparatus for coding and decoding the transmission data, in which a packet row having an identifier for processing or data as reference for processing disposed optimally, so that the decoding may be processed at high speed when decoding the packet row, in a packet multiplexing method for transmitting by multiplexing one program composed of digital image, digital sound, and digital data, or multiplexing plural programs.

It is a third object of the invention to present a packet generating method, a data multiplexing method using the same, and an apparatus for coding and decoding the transmission data, in which a secure instruction signal for reference clock or trick play is disposed optimally in the packet row so that the decoding process operation is stable when decoding the packet row, in a packet multiplexing method for transmitting by multiplexing one program composed of digital image, digital sound, and digital data, or multiplexing plural programs.

To achieve the first and second objects, the invention provides a packet generating method, a data multiplexing method using the same, and an apparatus for coding and decoding the transmission data, characterized by generating a packet row of digital data, containing a change identifier for identifying change of digital data in the packet row, and disposing the packet containing this change identifier closest to the packet containing changed digital data, among the packets containing various identifiers in the packet row.

To achieve the first and second objects, moreover, the invention provides a packet generating method, a data multiplexing method using the same, and an apparatus for coding and decoding the transmission data, characterized, when multiplexing, transmitting or recording plural programs, by generating a packet row of digital data including plural programs, containing a change identifier for identifying change of the plural programs in the packet row, and disposing the packet containing this change identifier closest to the packet containing changed program, among the packets containing various identifiers in the packet row.

Further, to achieve the objects, the packet multiplexing method of the invention is characterized by feeding a first packet row containing image, sound or other digital data and identifier for classifying the digital data, feeding a second packet row containing image, sound or other digital data and identifier for classifying the digital data, generating a first' packet row by converting the identifier of the first packet row, generating a second' packet row by converting the identifier of the second packet row, and multiplexing the first' packet row and second' packet row to generate and output a third packet row, wherein at least one packet including a "flag showing discontinuity" corresponding to a change identifier for identifying the change of discontinuity of digital data is multiplexed and outputted in the first' packet row.

At this time, the flag showing discontinuity is to be added to the packet to be multiplexed in the first place in each identifier of the first' packet row, or to be added to the packet to be multiplexed in the last place in each identifier of the first' packet row, or the packet setting the flag showing discontinuity to 1 is generated and multiplexed before multiplexing the first packet in each identifier of the first' packet row, or the packet setting the flag showing discontinuity to 1 is generated and multiplexed after transmitting the last packet in each identifier of the first' packet row. Accordingly, if the program sent out from the memory device is skipped halfway and the counter becomes discontinuous in FIG. 21(*c*), the decoding apparatus can continue the decoding process by referring to the discontinuity flag.

In the packet generating method of the invention, when dividing and generating input digital compressed image data into packets, if a packet contains specific code such as sequence start code and includes first bit of code that can cause change such as start of image sequence, a flag showing that random access is possible (corresponding to change identifier) is added to the packet. Accordingly, if a sequence start code is contained in the packet for transmitting image data, as the flag showing random access is possible is added, it is not necessary to search the sequence start code from the image packet.

Moreover, in the case of generation of multiplex packet by multiplexing a data packet containing at least one kind of digital data, and a table packet containing a table showing the packet content and packet number, when data is changed, such as change of content of table packet, before sending the data packet corresponding to the changed table packet, an instruction signal showing change of table packet (corresponding to change identifier) and changed table packet are multiplexed in the multiplex packet. As a result, when changing the program, the PMT or PCR is sent out prior to the data of changed content, so that the operation of the decoding apparatus may be secure.

Or, the packet of reference time signal to be multiplexed, before the packet containing digital data in the case of multiplexing a packet containing at least one kind of digital data and a packet containing a reference time signal of decoding apparatus, or before the packet containing discontinuous digital data in the case the content of the digital data is discontinuous, adds a reference time signal discontinuity flag showing that the reference time signal is not continuous (corresponding to change identifier), and also multiplexes the flag.

To achieve the third object, the data multiplexing method of the invention is characterized by feeding a first packet row multiplexing a packet containing at least one kind of digital data and a packet containing a reference time signal of decoding apparatus, feeding a second packet row multiplexing a packet containing at least one kind of digital data and a packet containing a reference time signal of decoding apparatus, and multiplexing the first packet row and second packet row to output a third packet row, wherein if a packet containing the reference time signal in the first packet row, and a packet containing the reference time signal in the second packet row are entered within a specific time, the reference time signal is deleted from the packet containing the reference time signal in the first packet row. As a result, the interval of reference signal PCR becomes less than a specific value, and hence clock reproduction is not disturbed.

Also, in the data multiplexing method of the invention, in the case of trick play by using plural packets containing sound data, image data and other digital data, a packet containing image, sound or data composes a trick play packet by data of same frame only, and the trick play packet is transmitted. Accordingly, the data of same picture only is composed into PES packet at the time of trick play and is sent out to the decoding apparatus, so that the image is not interrupted halfway.

In the multiplex data decoding method of the invention, a packet containing digital image data compressed by using compressive coding in frame or field, or compressive coding between frames or fields is decoded, and when freezing in an arbitrary frame or field by using the decoded data, the image decoding the image data by compressive coding in frame or in field immediately before or immediately after is displayed as a still image when receiving a freeze command signal.

Or, in the case of decoding a packet adding a flag showing decoding or display time to the compressed digital image data and freezing in an arbitrary frame or field by using the decoded data, when receiving a freeze command signal, a flag showing decoding or display time of image data that can be accessed immediately before or immediately after in time is stored, and when resuming freezing, the flag showing decoding or display time of the accessible image data is sent to the multiplexing apparatus, and thereby decoding is resumed from the accessible image data. Accordingly, when freezing image display, by freezing in a picture coded in frame and transmitting the time information of the frozen picture to the transmitting device, continuous image can be reproduced after freezing by resending from the image data of frozen picture.

Further, in the multiplex data decoding method of the invention, in a multiplex data decoding apparatus for feeding a packet row in which at least one program is multiplex, and separating into image, sound or other data, if a table packet for identifying the picture, sound or other digital data is multiplexed in each program, the tablet packets other than the programs to be decoded are also stored in the memory. As a result, when recording the digital data composed of packet rows containing plural programs, programs can be changed over promptly by storing other tablet packets than the programs to be decoded into the memory.

BRIEF DESCRIPTION OF THE DRAWINGS

FIG. 19(a) shows a format of PES packet, and (b) is an explanatory diagram of a header;

FIG. 21(a) shows a TS packet row, (b) is a format of TS packet, (c) is a header of TS packet, (d) is an explanatory diagram of adaptation field, and (e) is an explanatory diagram of optional field;

FIG. 22 is an explanatory diagram showing a conventional packet multiplexing method;

FIG. 25 is a block diagram of a multiplex data decoding apparatus for decoding data multiplexed in a conventional data multiplexing method.

DESCRIPTION OF THE PREFERRED EMBODIMENTS

First Embodiment

Figure 1:
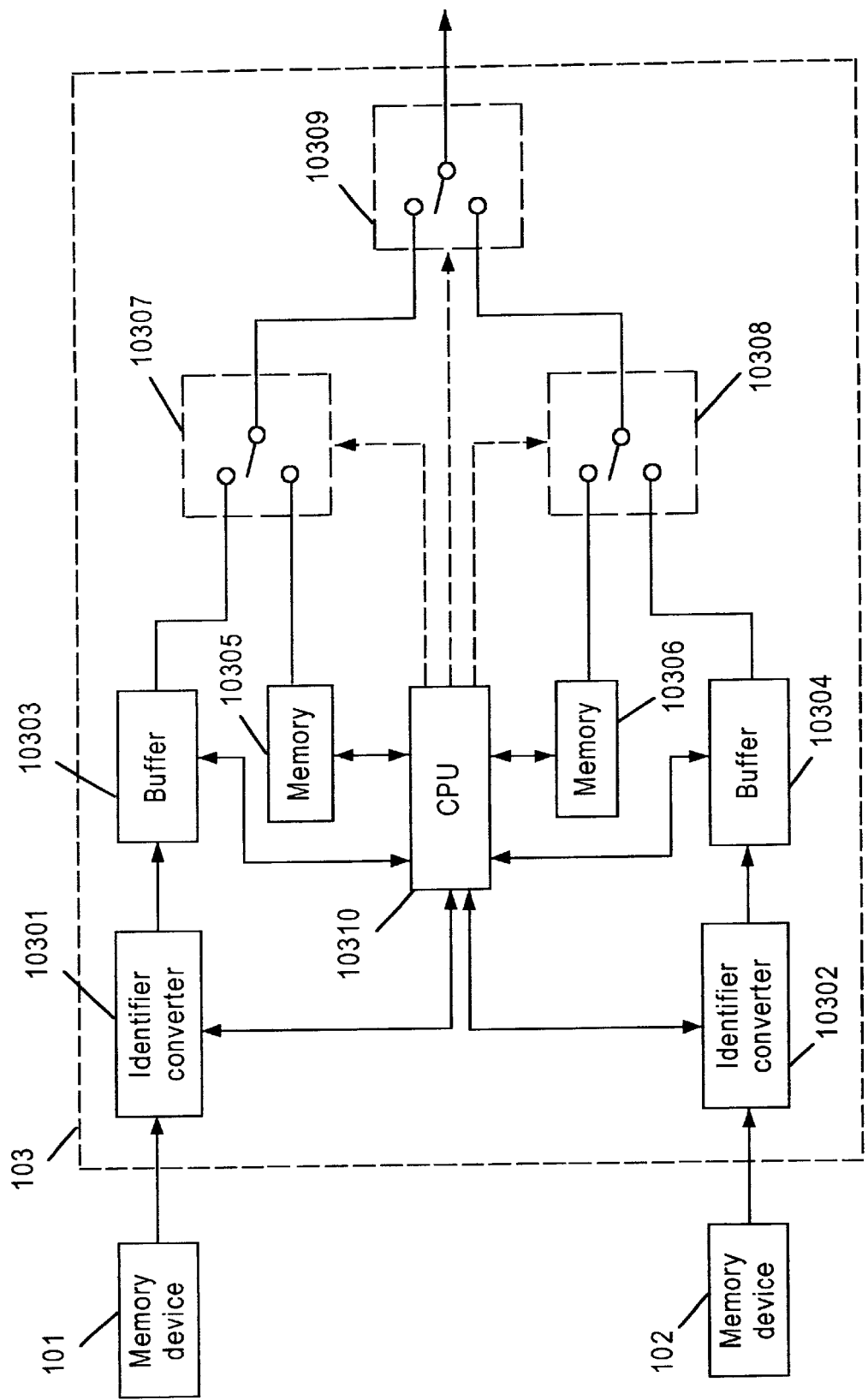
FIG. 1 is a block diagram of a packet multiplexing apparatus in a first embodiment of the invention.
Figures 2A, 2B, 2C:
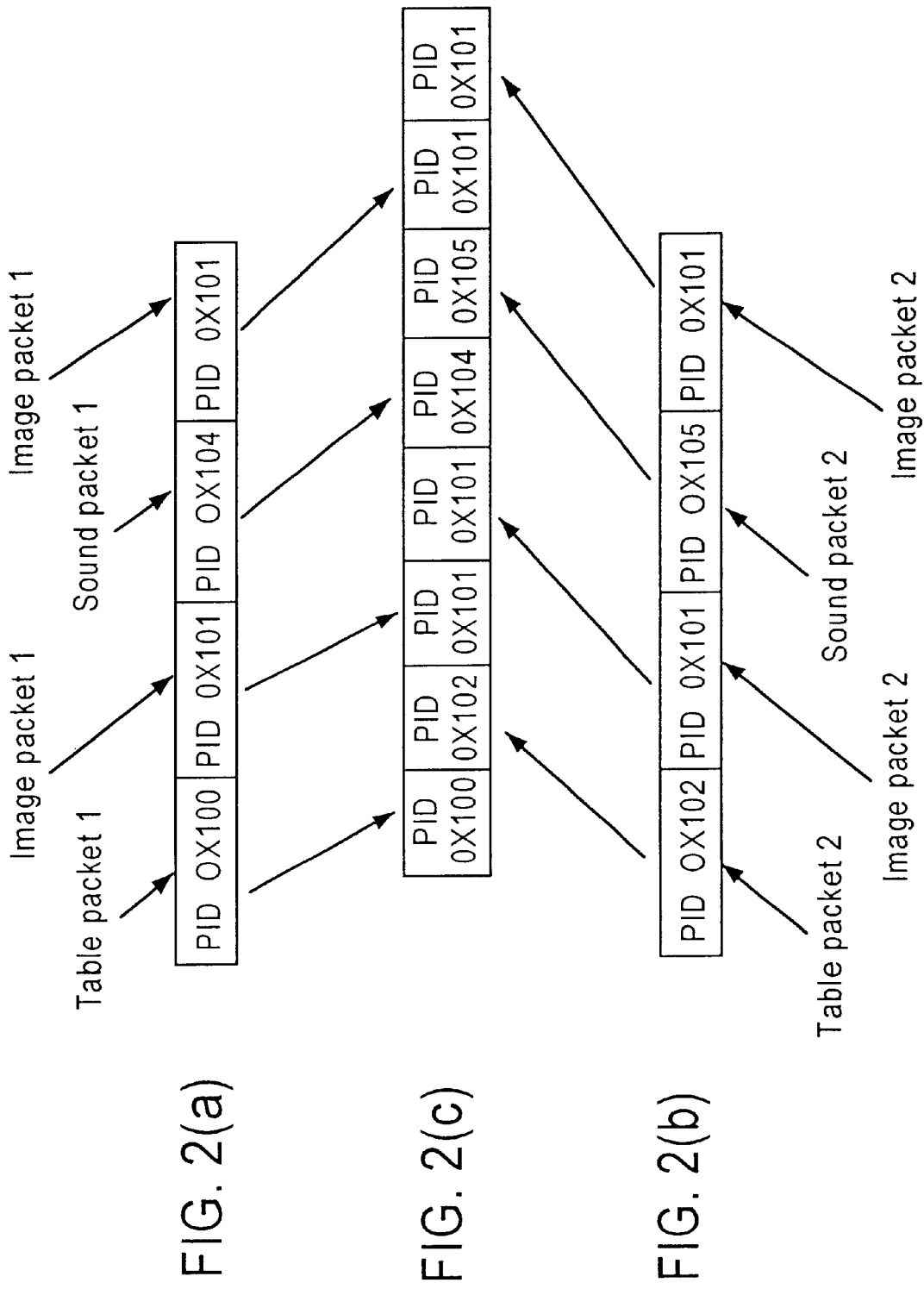
FIG. 2(*a*) shows a first packet row, (*b*) shows a second packet row, and (*c*) shows a packet multiplexed state of the first and second packet rows.
Figure 3:
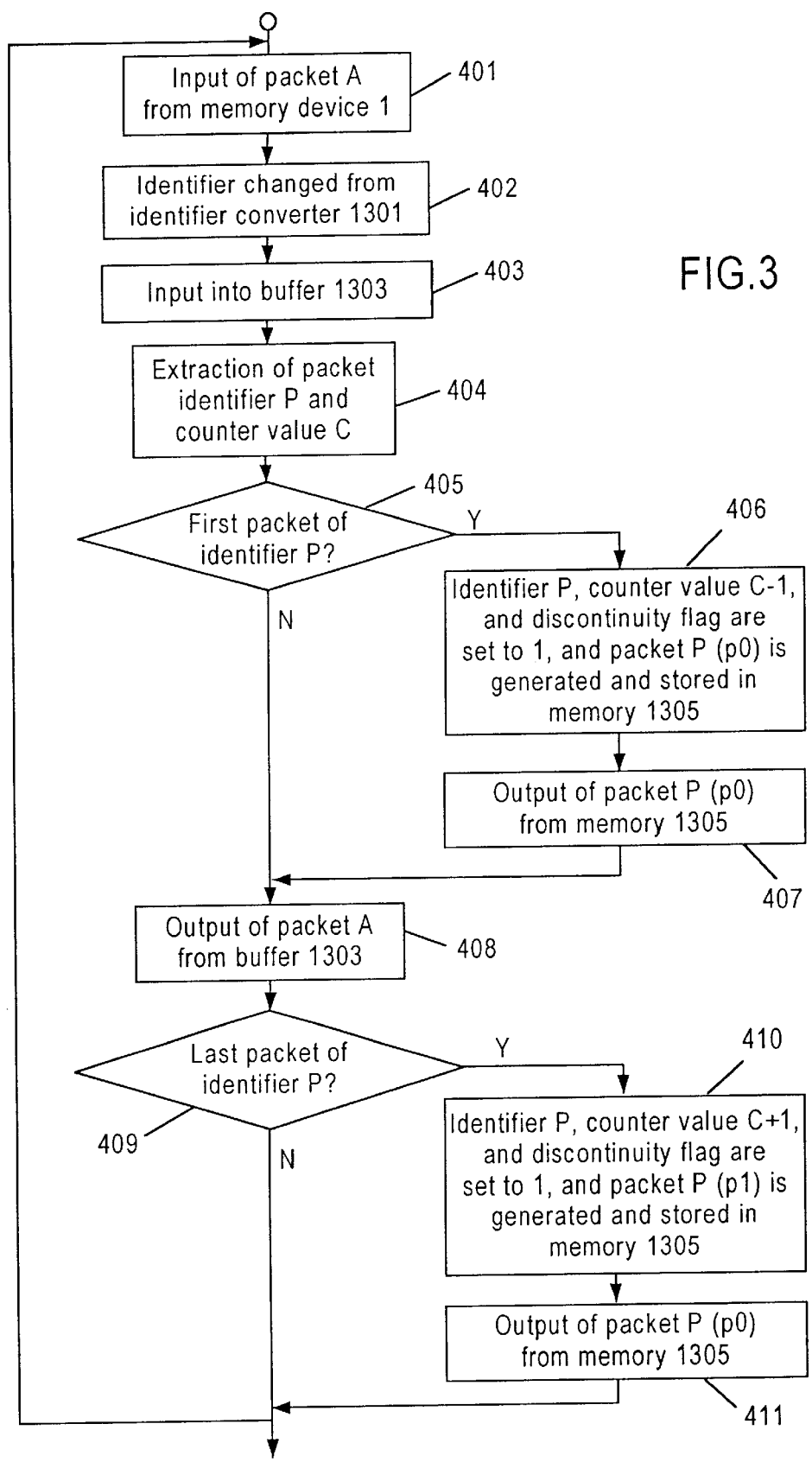
FIG. 3 is an explanatory diagram showing part of operation of CPU 1310 in a packet multiplexing unit 103 in the first embodiment of the invention.
Figure 4:
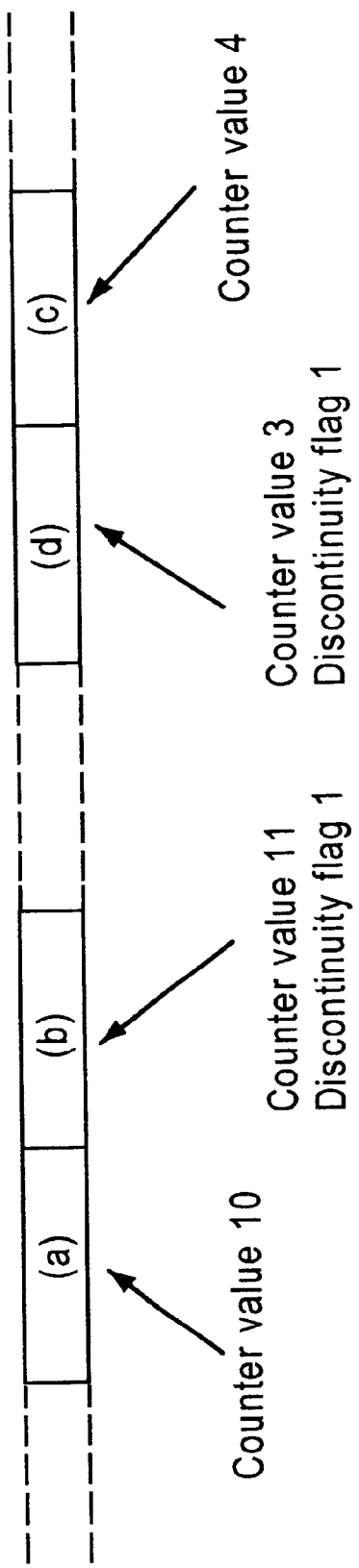
FIG. 4 is an explanatory diagram showing an example of packet row outputted in the packet multiplexing unit 103 in the first embodiment of the invention.

FIG. 1 is a block diagram of a packet multiplexing apparatus in a first embodiment of the invention. In FIG. 1, reference numeral 101 is a first memory device, 102 is a second memory device, and 103 is a packet multiplexing unit, which is composed of a first identifier converter 10301, a second identifier converter 10302, a first buffer 10303, a second buffer 10304, a first memory 10305, a second memory 10306, a first switch 10307, a second switch 10308, a third switch 10309, and a CPU 10310. FIG. 2 is an explanatory diagram of an example of operation of the identifier converter shown in FIG. 1. FIG. 3 is a flowchart explaining part of operation of the CPU 10310. FIG. 4 is an explanatory diagram of an example of packet row outputted in the first embodiment.

In thus constituted packet multiplexing apparatus, the packet multiplexing method is described below while referring to FIGS. 1, 2, 3 and 4.

Figure 20:
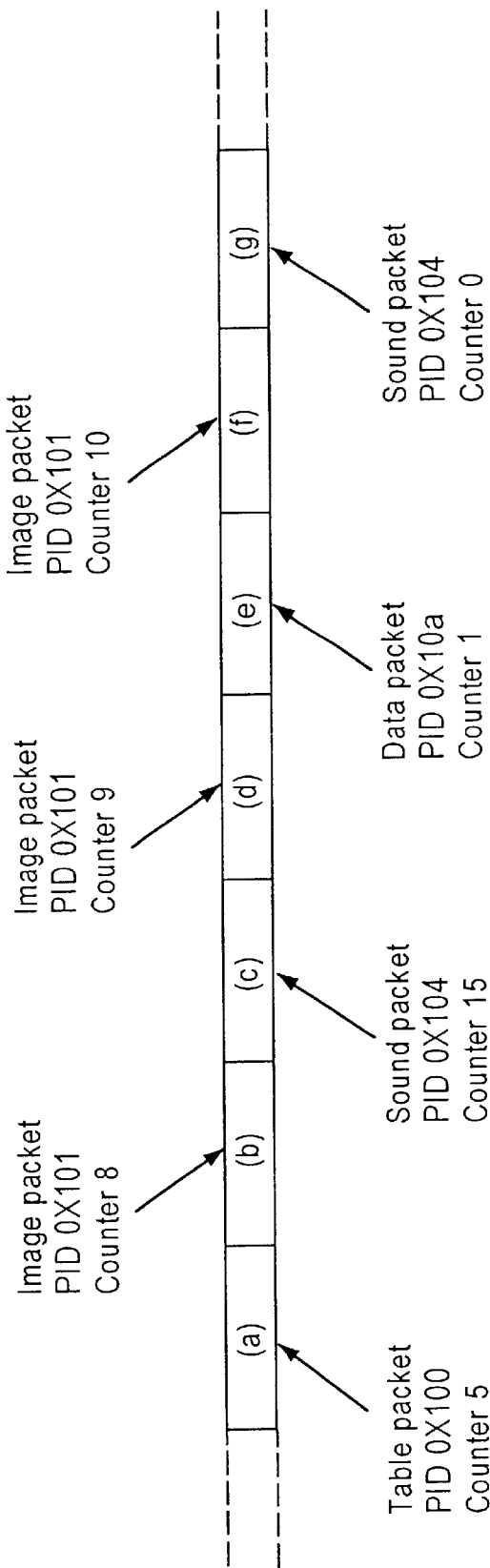
FIG. 20 is an explanatory diagram showing an example of packet row.
Figure 23:
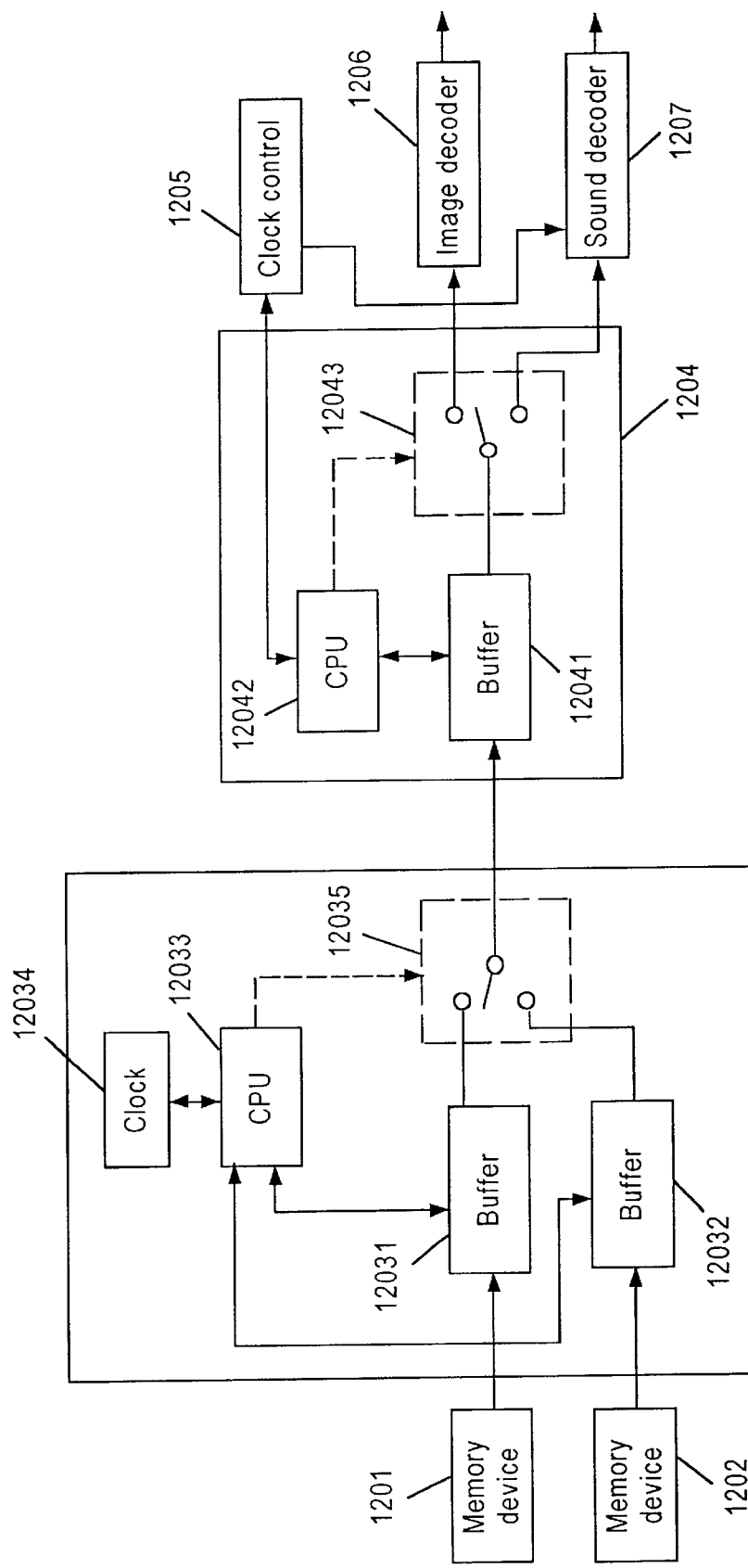
FIG. 23 is an explanatory diagram showing an example of conventional packet multiplexing apparatus and decoding apparatus.
Figure 24:
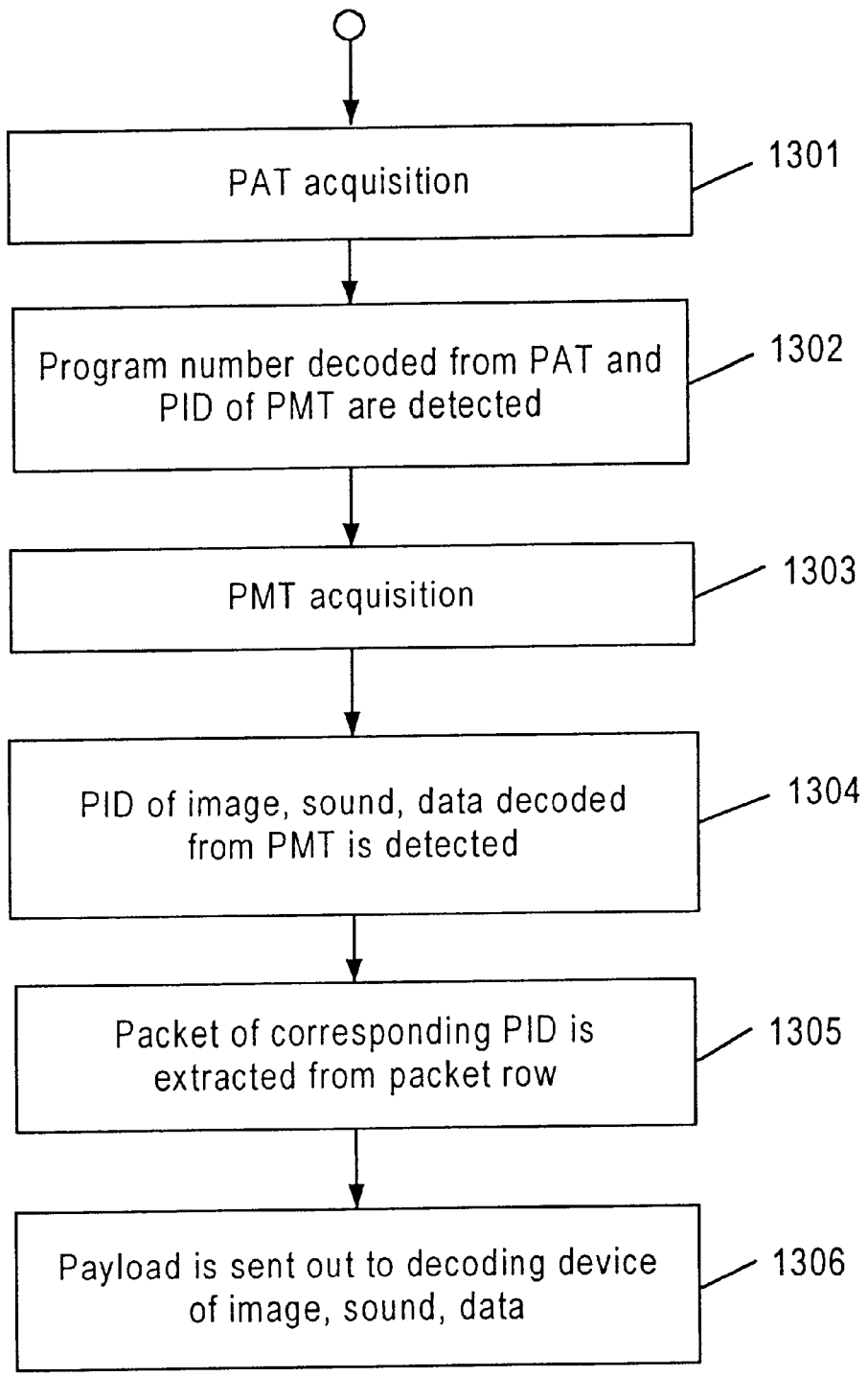
FIG. 24 is an explanatory diagram showing a conventional multiplex data decoding method.

The memory device 101 sends out a first packet row, and the memory device 102 sends out a second packet row. The first and second packet rows are same as packet rows in prior art shown in FIG. 21. The first packet row transmits a first program, and the second packet row transmits a second program. Herein, the first packet row is explained. In the first packet row, a packet of image, sound and data as in prior art shown in FIG. 20, and a table packet as in prior at shown in FIG. 22 are multiplexed. The packet contains an identifier (PID) and a counter as shown in FIG. 21.

The packet multiplexing unit 103 receives the fist packet row sent out from the memory device 101 as shown in the flowchart in FIG. 3, and converts the PID at step 402. This is intended to avoid duplication of PID of the first packet row and second packet row. If there is a same PID in the first packet row shown in FIG. 2(a) and second packet row shown in FIG. 2(b), the same PID exists as shown in FIG. 2(c), and therefore if multiplexed without converting the PID beforehand, the video and audio data cannot be decoded correctly in the decoding apparatus.

The packet row converted in PID is put into the buffer 10303. In the case of a first input packet with each PID, at step 406, a packet containing the same PID value as the input packet, a counter value one count smaller than the counter of the input packet or 15 when the counter value of the input packet is 0, and a discontinuity flag set at 1 is generated, and stored in the memory 10305, the generated packet is put out of the memory, and the input packet is put out of the buffer. In the case of the last input packet with each PID, after putting out the input packet, at step 410, a packet containing the same PID value as the input packet, a counter value one count larger than the counter of the input packet or 15 when the counter value of the input packet is 0, and a discontinuity flag set at 1 is generated, and stored in the memory, and the generated packet is put out of the memory.

Methods for judging the first input packet include a method of picking up the packet entering the buffer after the CPU gives a packet send request to the memory device, and a method of picking up the packet entering the buffer after an instruction is given from outside of the multiplexing unit 103. Similarly, methods for judging the last input packet include a method of detecting no input of packet of the PID within a certain time, a method of giving an instruction from outside of the multiplexing unit 103, and a method of confirming no packet row is sent out if packet send is requested to the memory device 101.

The first packet row is so far explained, and a discontinuity flag is also added to the second packet row in the same procedure. The first packet row sent out from the switch 10307 is multiplexed with the second packet row sent out from the switch 10308, and transmitted. In this embodiment, discontinuity is supposed to occur when multiplexing the first and second packet rows, but as estimated from the method of giving discontinuity flag in every packet row, same effects are obtained when applied to the case of occurrence of discontinuity in one packet row or one program.

According to the embodiment, FIG. 4 shows an example of packet row outputted from the switch 10307 in the case of resending by jumping from the position of the packet row presently being sent out by the memory device to the position of specified time. For jumping operation, the memory device interrupts sending of packet row after sending out the packet (a) shown in FIG. 4. The CPU 10310 generates and puts out the packet (b) at step 410 shown in FIG. 3. The memory device, after jumping to specified position, resumes sending from packet (c). The CPU 10310, at step 406 in FIG. 3, generates packet(d) and outputs (d) before outputting (c). In the packet row as shown in FIG. 4, if the counter is discontinuous, the decoding apparatus does not cause packet discarding or other problem by referring to the discontinuity flag.

Thus, according to the embodiment, packet multiplexing without packet discarding due to counter discontinuity is realized in the decoding apparatus. In the embodiment, one packet setting the discontinuity flag to 1 is multiplexed before the first multiplexed packet and after the last multiplexed packet, but not limited to one, a plurality may be multiplexed.

Second Embodiment

Figure 5:
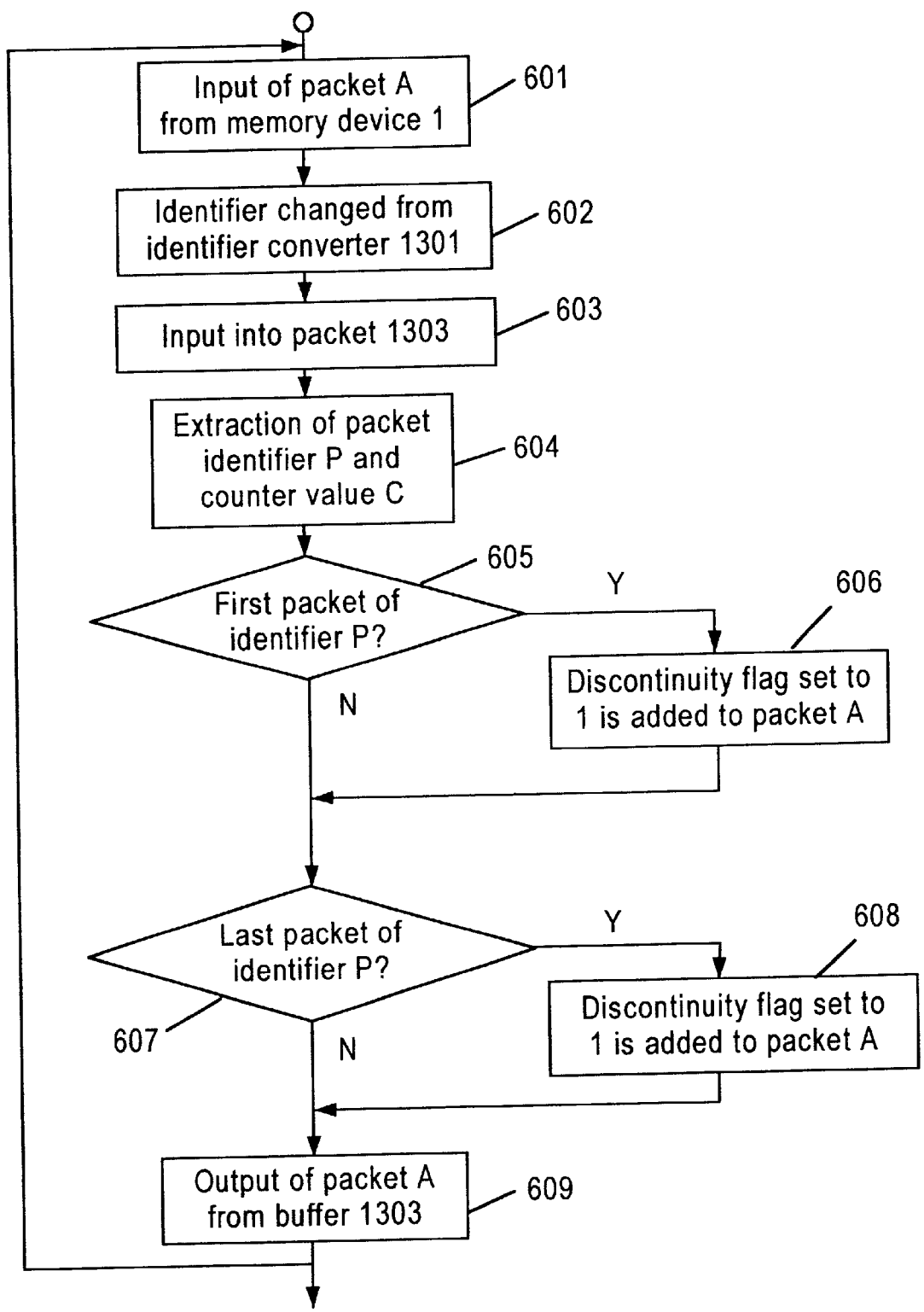
FIG. 5 is an explanatory diagram showing a second embodiment of the invention.

FIG. 5 is an explanatory diagram of a packet multiplexing method in a second embodiment of the invention. Referring to FIG. 5, it is described below.

What this embodiment differs from the first embodiment is that the discontinuity flag of the first packet is set to 1 to multiplex as shown in step 606, instead of multiplexing by generating a packet setting the discontinuity flag to 1 before multiplexing the first packet as shown in step 406 in FIG. 3 in the first embodiment, and that the discontinuity flag of the last packet is set to 1 to multiplex as shown in step 608, instead of multiplexing by generating a packet setting discontinuity flag to 1 after multiplexing the last packet as shown in step 410.

According to the embodiment, since the discontinuity flag is present in the adaptation field which is an optional field as shown in FIG. 21, it is not necessary to generate a new packet and multiplex, although the load of the CPU 10310 is slightly increased by investigation of presence or absence of adaptation field, and hence the memory 10305 and switch 10307 are not needed, while the same effects as in the first embodiment are obtained.

Third Embodiment

Figure 6:
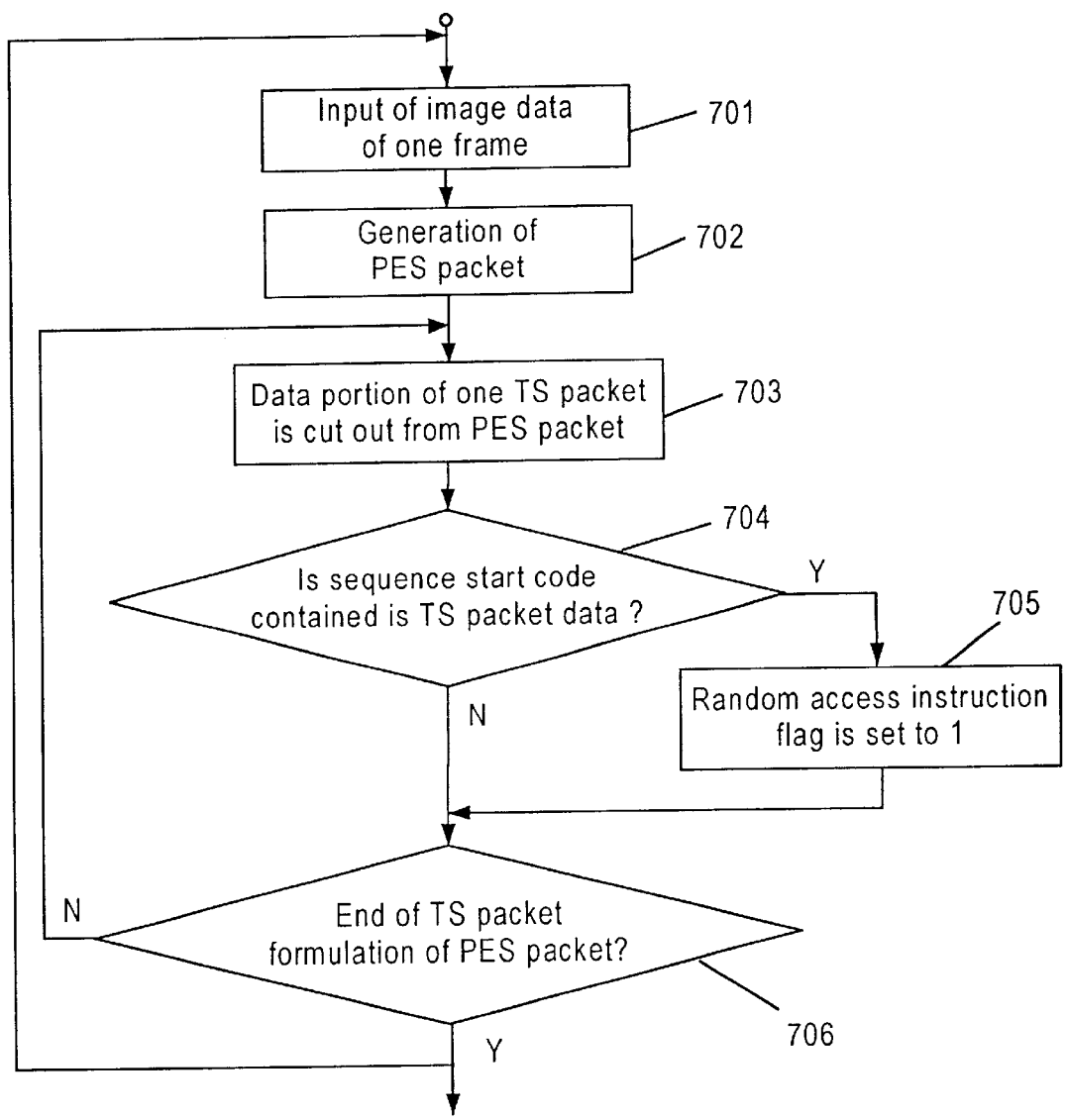
FIG. 6 is an explanatory diagram showing a packet generating method in a third embodiment of the invention.

FIG. 6 is an explanatory diagram of a packet generating method in a third embodiment of the invention. Referring to FIG. 6, it is described below.

The image data compressed in the MPEG image compressing method contains header information such as sequence header and picture header, aside from data of each image frame. These headers always begin with a bit pattern called unique start code, and, for example, the sequence header begins with a sequence start code composed of bit pattern of "00000000000000000000000111010011". The image decoding apparatus detects the sequence start code before starting decoding of image frame data, and analyzes the sequence he ader in order to obtain the attribute of the image data.

On the other hand, in the multiplex data separating apparatus for separating image or sound data from an input packet row, generally, to refer to the image data and judge if sequence start code is included in the packet or not requires a high load of CPU and it is not realistic. In the MPEG, a random access instruction flag is provided in the adaptation field of TS packet shown in FIG. 21, and when this flag is set to 1, it is clear that the packet contains a sequence start code. In the conventional MPEG2 standard, however, the random access instruction flag is optional, and is not always required. For example, the random access instruction flag may not be set to 1 at all in a series of stream.

In such conventional MPEG2 standard, however, in the input packet row, it is possible that there is no packet having random access instruction flag set to 1, and the multiplex data decoding apparatus cannot control output to the image decoding apparatus by random access instruction flag. Accordingly, in the packet generating method of the invention, in the TS packet including sequence start code, it is designed to send out always by setting the random access instruction flag to 1.

According to the flowchart in FIG. 6, first at step 701, image data of one frame is put in. Prior to frame data, if containing various headers such as picture header and sequence header, all including these headers is handled as one frame. At next step 702, a PES packet is generated. One PES packet may be generated in one frame, or one frame may be divided and plural PES packets may be generated. At step 703, cutting out PES packet and adding TS packet header, a TS packet of 188 bytes in length is generated. When the TS packet contains a sequence start code, at step 705, random access instruction flag is set to 1. Steps 703 to 705 are repeated until all data of PES packet generated at step 702 are compiled into TS packet.

Thus, when generating TS packet, if containing sequence start code of image data, by setting the random access instruction flag always to 1, the multiplex data decoding apparatus judges presence or absence of sequence start code by random access instruction code, without having to search the content of the image data packet, and hence can control output.

In the embodiment, an example of image data is mentioned, but the embodiment may be also applied to sound data. In such a case, however, instead of the sequence start code of image data, a frame synchronizing word showing start of sound frame is used.

Fourth Embodiment

Figure 7:
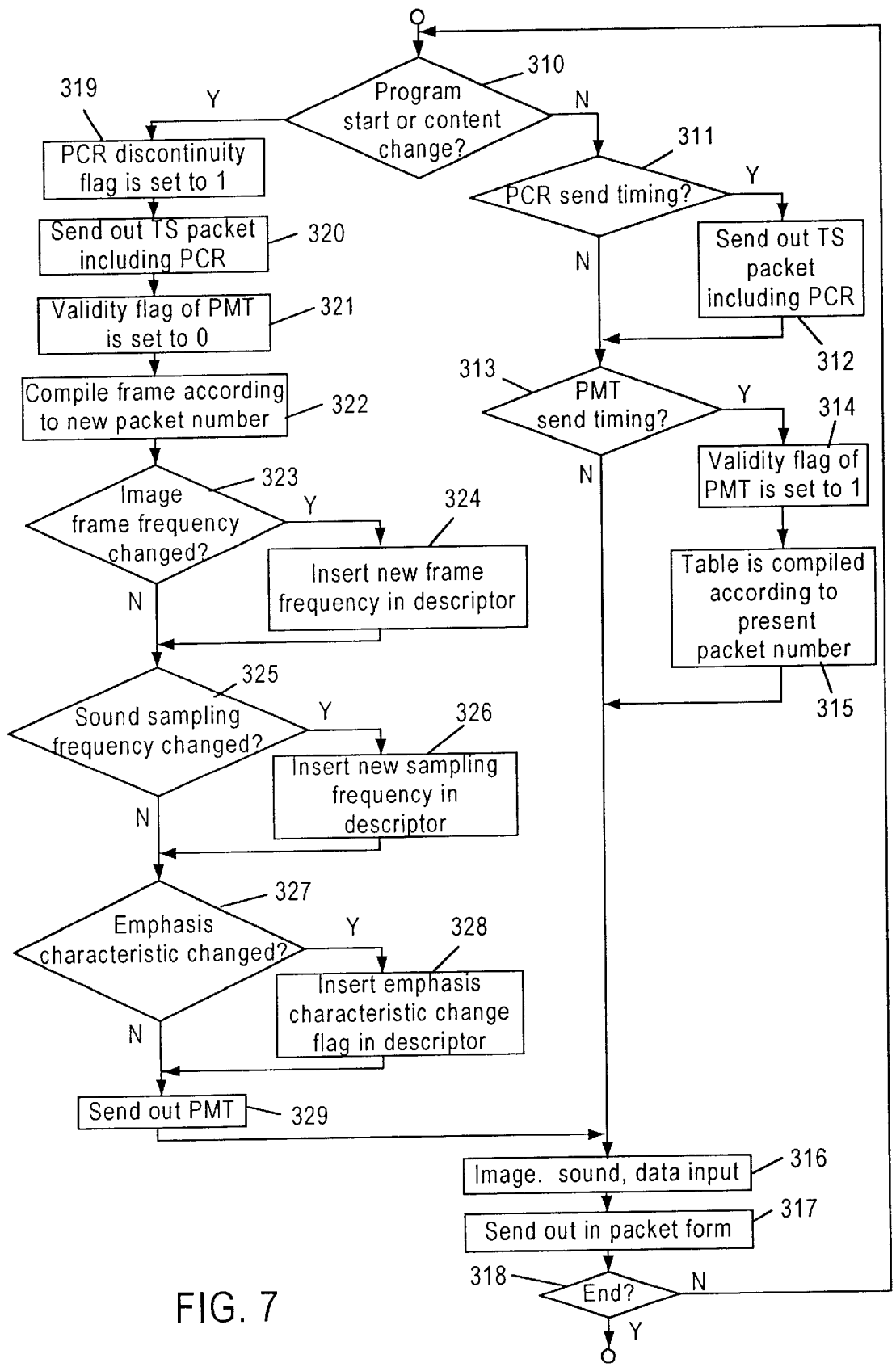
FIG. 7 is an explanatory diagram showing a data multiplexing method in a fourth embodiment of the invention.
Figure 8:
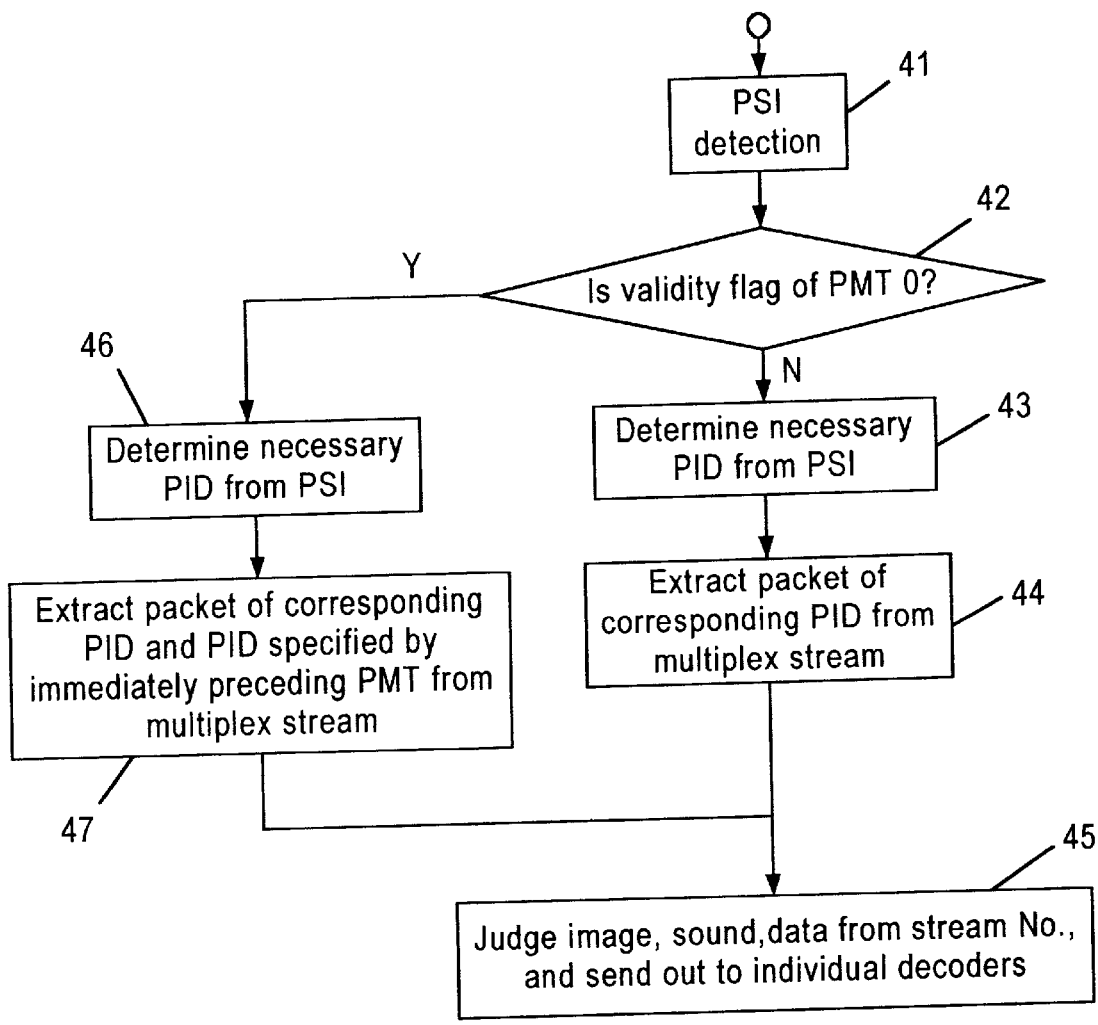
FIG. 8 is an explanatory diagram of a multiplex data decoding method in the fourth embodiment of the invention.

FIG. 7 is an explanatory diagram of a data multiplexing method in a fourth embodiment of the invention, and FIG. 8 is an explanatory diagram of a multiplex data decoding method. The flowchart in FIG. 7 shows the operation of the CPU 12 of the first data multiplexing unit 1 in FIG. 1. FIG. 8 is an explanatory diagram showing operation of the CPU 2512 of the multiplex data decoding apparatus 251 in FIG. 25. The embodiment is explained by referring to FIG. 7 and FIG. 8.

The data multiplexing unit 1 generally operates by repeating the steps of sending out PMT, PCR at proper timing, converting PES packet of image, sound and data into TS at proper timing, and multiplexing and sending out.

On the other hand, when a data multiplexing method may be characterized by multiplexing an instruction signal showing change of table packet and changed table packet in a multiple packet, before sending out the data packet corresponding to the changed table multiple packet, before sending out the data packet corresponding to the changed table packet, when changing the content of table packet, in the case of generating a multiplex packet by multiplexing a data packet containing at least one kind of digital data, and table packet containing the table showing the packet content and packet number. For example, starting a program, since the multiplex data decoding apparatus is not synchronized with the multiplexing apparatus, it is required to send a packet including reference time PCR. After sending out the PCR packet, the decoding apparatus attempts to synchronize on the basis of the transmitted PCR. When starting a program, PCR completely indifferent to the decoding apparatus is sent in, and it takes times in synchronizing. Accordingly, as indicated by 319 in FIG. 7, PCR discontinuity flag showing PCR is discontinuous is set to 1. In the decoding apparatus, when it is detected that the discontinuity flag is 1, not attempting to synchronize with the transmitted PCR, the transmitted PCR value is set to wait for next PCR. Therefore, the time until synchronization is shortened. This operation is effective not only when starting a program, but also when the content is changed and the reference time PCR is changed.

When starting a program, moreover, it is also necessary to send a PUT expressing the relation between the program and the PID. At this time, as indicated by 321 in FIG. 7, first the validity flag of PMT is set to 0, and a table is created according to a new packet number PID (322). When the validity flag of PMT is 0, the multiplex data decoding apparatus recognizes the PMT is invalid, and generally this PMT is not used. Next, when PMT with validity flag of 1 comes in, this PMT is used in decoding. In the conventional MPEG2 standard, there is not clear definition of the program change and method of use of PMT validity flag. Therefore, it is also possible to send a different PMT while setting the validity flag of PMT at 1.

In the general decoding apparatus, however, it takes a certain time in a series of actions of changing the PMT, determining the PID of the TS packet necessary for decoding from the changed PMT, and starting extraction of the TS packet having desired PID from the transmitted data. As a result, the packet right after receiving the changed PMT cannot be extracted accurately, and part of data is lost, and the image or sound may be interrupted momentarily.

In the invention, accordingly, before sending out a new PMT, that is, when starting a program, or when changing the program content, the validity flag 0 of PMT is added, and a PMT corresponding to a new content is sent out.

The multiplex data decoding apparatus determines necessary PID from PMT when receiving PMT having validity flag 0 as shown in flowchart 46, 47 in FIG. 8, and prepares to extract a packet having a PID necessary for decoding when starting a program, that is, updating the PMT, extraction is started from the PID successive to the PMT having validity flag 1. When the content of the program is changed halfway, by receiving the PMT having validity flag 0, extraction of present valid PID is continued, and at the same time the PMT is updated by a new PMT, thereby starting extraction of TS packet having PID corresponding to a new content from the PID successive to the PMT having validity flag 1.

As described herein, by sending out a PMT having validity flag 0 prior to an actually valid PMT, extraction error of PID does not occur if there is delay in the decoding apparatus, and the image and sound can be reproduced without interruption.

The frame frequency in image and sampling frequency in sound are the output frequency and action determining frequency of the decoding apparatus, and the clock as the source thereof is generally generated from the received reference clock PCR. The emphasis characteristic in sound is also required to change the output sound and set the characteristic itself, and a certain time is required for setting change of them. Therefore, when data changed in characteristic is sent continuously, it is impossible to decode the data of the received packet correctly in the time required for setting.

In the invention, accordingly, as indicated by 323, 324, 325, 326, 327, and 328 in FIG. 7, before sending out the changing data, it is designed to send out by describing the frame frequency of image after change, sampling frequency in sound, or emphasis characteristic in the region called descriptor of PMT. By sending out such data, the decoding apparatus can change the clock or characteristic before receiving actual data, so that normal decoding is possible if changed data is received.

Fifth Embodiment

Figure 9A:
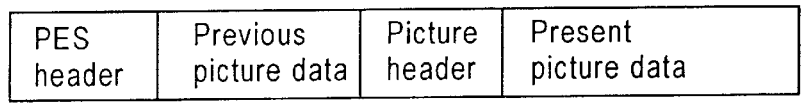
FIG. 9(a) shows a state of two picture data existing in PES packet, and (b) is a state restructured into one picture and one packet.
Figure 9B:
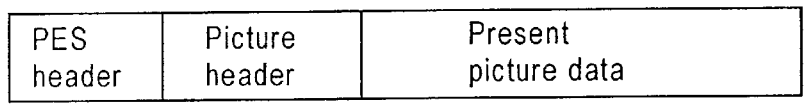
Figure 10:
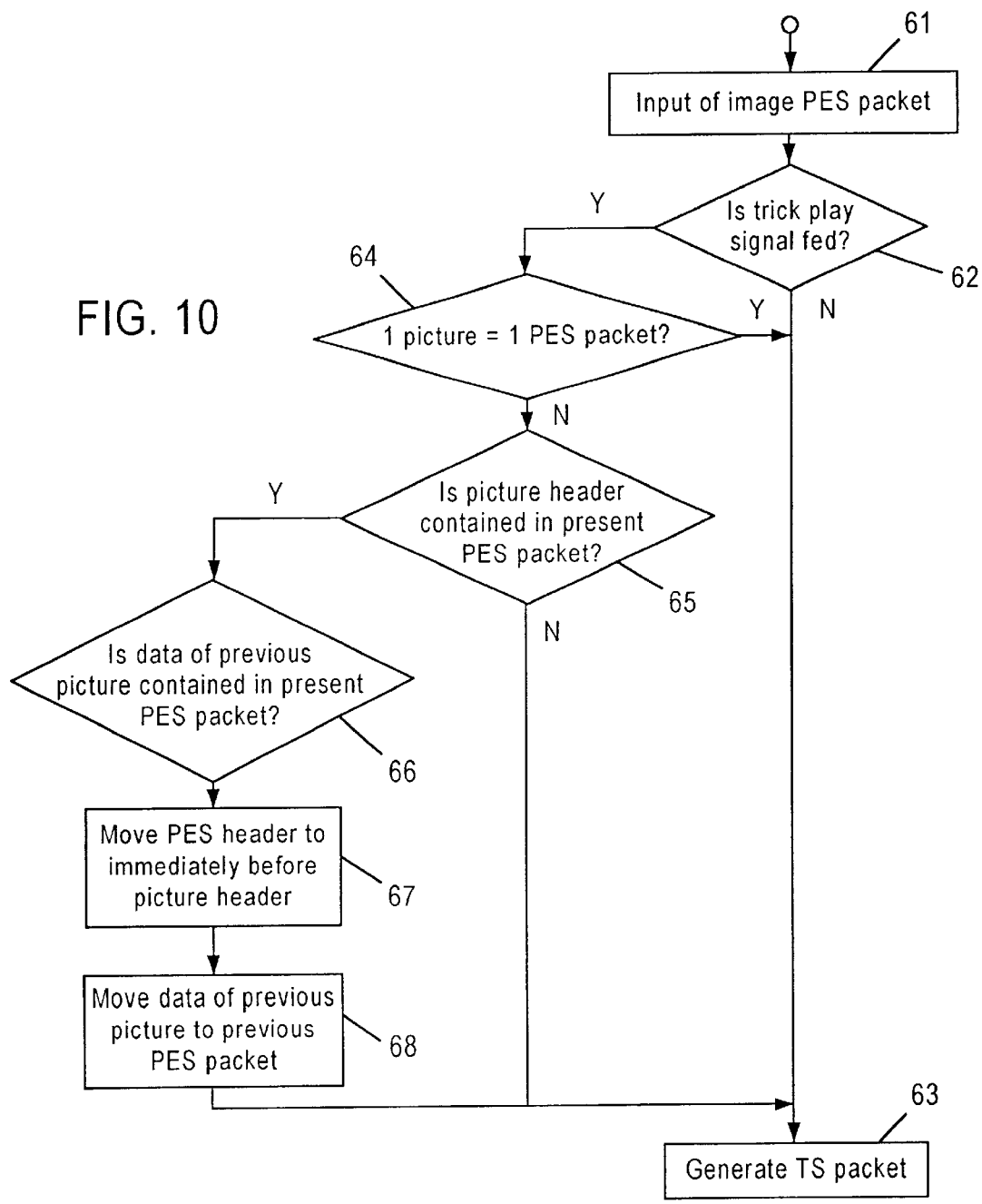
FIG. 10 is an explanatory diagram showing a data multiplexing method in a fifth embodiment of the invention.

FIG. 9 and FIG. 10 are explanatory diagrams showing a data multiplexing method in a fifth embodiment of the invention. Referring now to FIG. 9 and FIG. 10, it is described below.

In a PES packet of image, it is possible that plural pictures may be contained in one packet as shown in FIG. 9(a). Herein, a picture refers to a frame or field in MPEG image compression. Whether frame or picture is determined by the method of compressive coding. In FIG. 9(a), data of two pictures is contained in a same packet.

In the case of trick play such as fast forward, slow and still, as shown in FIG. 19, a trick mode flag telling such action as fast forward in the PES head to the data decoding apparatus is set and sent together with image data. Reading these flags, the decoding apparatus performs buffer control and screen control. Usually, these trick play actions are controlled in the frame or field, that is, in the picture unit.

Incidentally, if data of more than one picture is mixed in the PES packet as shown in FIG. 9(a), by disposing a buffer in the decoding apparatus, it is necessary to restructure the data for one picture from two PES packets. Accordingly, in the invention, it is designed to transmit by restructuring the PES packet as shown in FIG. 9(a) into one picture and one packet before transmission as shown in FIG. 9(b).

Figure 11:
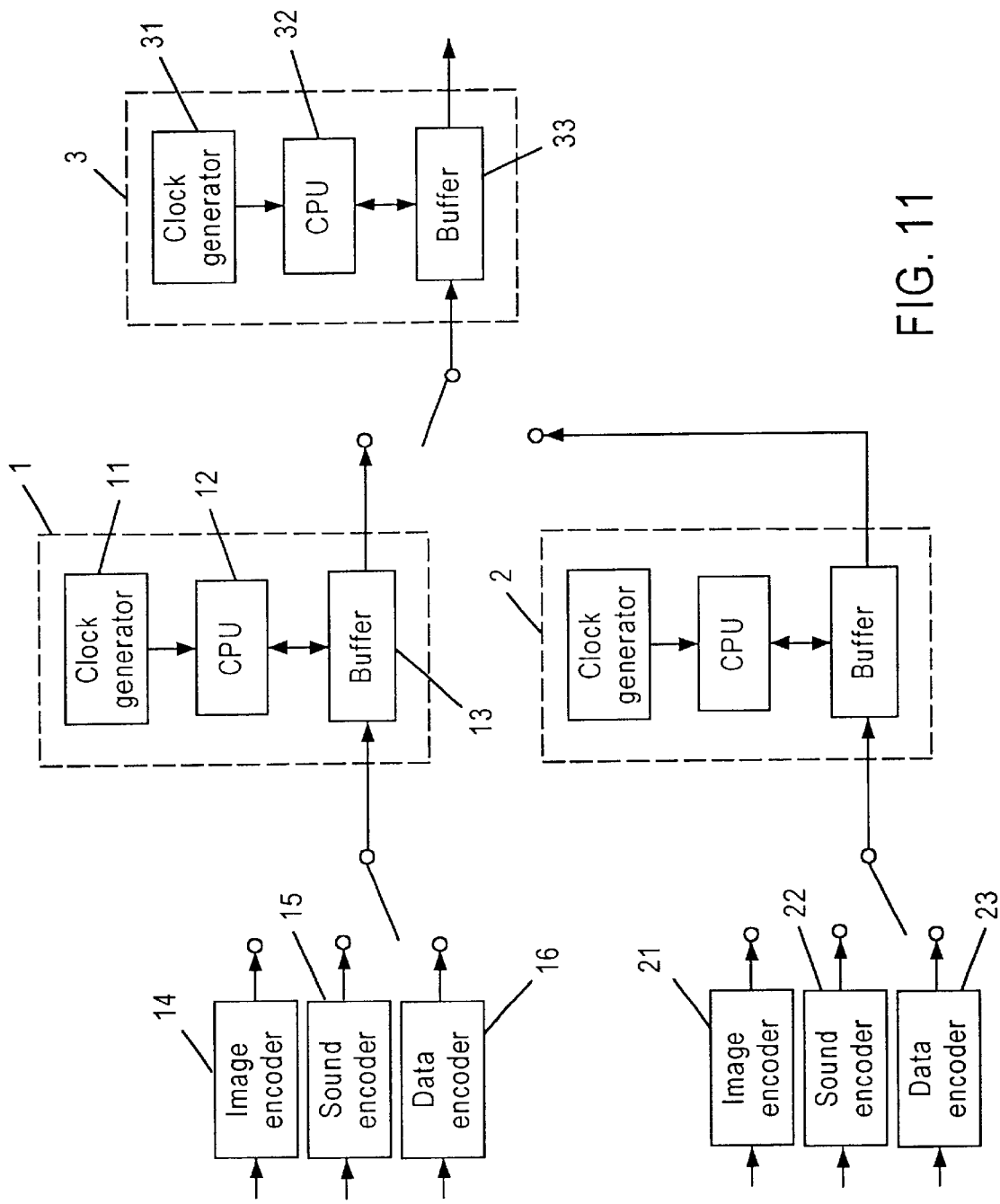
FIG. 11 is a block diagram of a data multiplexing apparatus in a sixth embodiment of the invention.

FIG. 10 is a flowchart for realizing the above action, and it is used, for example, as algorithm of CPU 12 of the first data multiplexing unit 1 in FIG. 11. As the action of the CPU, when a signal requiring trick play is entered, at 64, first it is checked if one picture is composed of one PES packet or not, and if not, at 66, 67, 68, the position of the PES header is updated to immediately beneath the picture header.

By this operation, only one picture is contained in one packet, and the correspondence between trick mode flag and picture data is clarified, and complicated operation of decoding apparatus or hardware is not necessary.

Only the image data is described in this embodiment, but similar actions are valid also in sound data. In the case of sound data, the picture is replaced by the frame showing the unit of compressive coding.

Sixth Embodiment

A data multiplexing method in a sixth embodiment of the invention is described below while referring to the drawings.

FIG. 11 is a block diagram of the data multiplexing apparatus in the sixth embodiment of the invention. In FIG. 11, reference numeral 1 is a first data multiplexing unit, which is composed of a clock generating circuit 11, a CPU 12, and a buffer 13.

Figure 12:
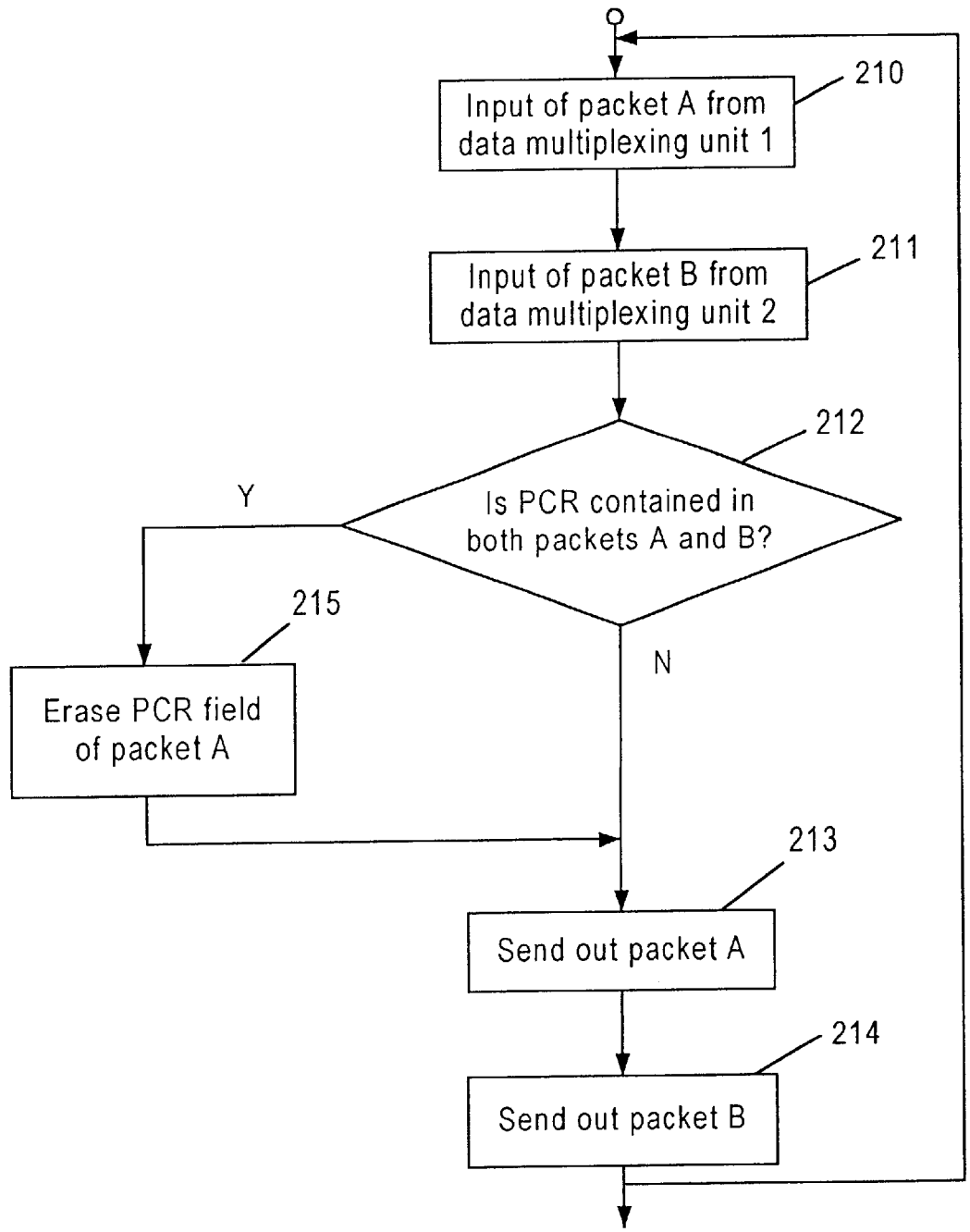
FIG. 12 is an explanatory diagram showing part of operation of a CPU 32 in a third data multiplexing unit in a sixth embodiment of the invention.

Reference numeral 2 is a second data multiplexing unit, 3 is a third data multiplexing unit, and both are same in construction as the first data multiplexing unit. FIG. 12 is an explanatory diagram showing part of operation of the CPU 32 in the third data multiplexing unit.

In thus constituted data multiplexing apparatus, the data multiplexing method is described below while referring to FIG. 11 and FIG. 12.

Image data, sound data, and other data to be multiplexed are respectively coded compressively in an image encoder 14, a sound encoder 15, and a data encoder 16, formed into PES packet same as in prior art shown in FIG. 19, and put into the first and second data multiplexing units. In the first and second data multiplexing units 1, 2, image, sound and data are synchronized, and multiplexed while converting from PES packet to TS packet so as not to cause overflow or underflow in the multiplex data decoding apparatus. The outputs of the data multiplexing unit 1 and data multiplexing unit 2 are further multiplexed in the data multiplexing unit 3. Assuming, herein, that the outputs of the data multiplexing units 1 and 2 are both 4 Mbps, it is supposed to send out the both into a transmission route of 8 Mbps.

The data multiplexing unit 3, as shown in FIG. 12, receives TS packets from the data multiplexing unit 1 and data multiplexing unit 2 at 210, 211, and multiplexes and outputs these inputs, for example, alternately. What matters at this time is when the both packets contain reference clocks PCR that are simultaneously required in the multiplex decoding apparatus. For the ease of design of the multiplex data decoding apparatus, it is desired to suppress fluctuations of reference clock PCR below a certain value, and it is below 30 ppm in the cited example of prior art. If, however, the TS packets of the multiplexing units 1 and 2 simultaneously enter the data multiplexing unit 3, deviation of one TS packet is caused because of multiplexing, which results in fluctuation of PCR.

In this embodiment, therefore, the reference clock PCR is frequently inserted into multiplex data beforehand, and in the event of collision, as in flowchart 212, 215 in FIG. 12, the PCR field contained in the input side TS packet of the multiplexing unit 1 is erased. The PCR field is an option, and has no effect is erased. The interval of the packet containing PCR is slightly elongated, but since inserted frequently beforehand, there is no effect on the operation of the multiplex data decoding apparatus.

Thus, according to the embodiment, data multiplexing is realized without causing any adverse effect on the reference clock PCR of the multiplex data decoding apparatus.

Seventh Embodiment

Figure 13:
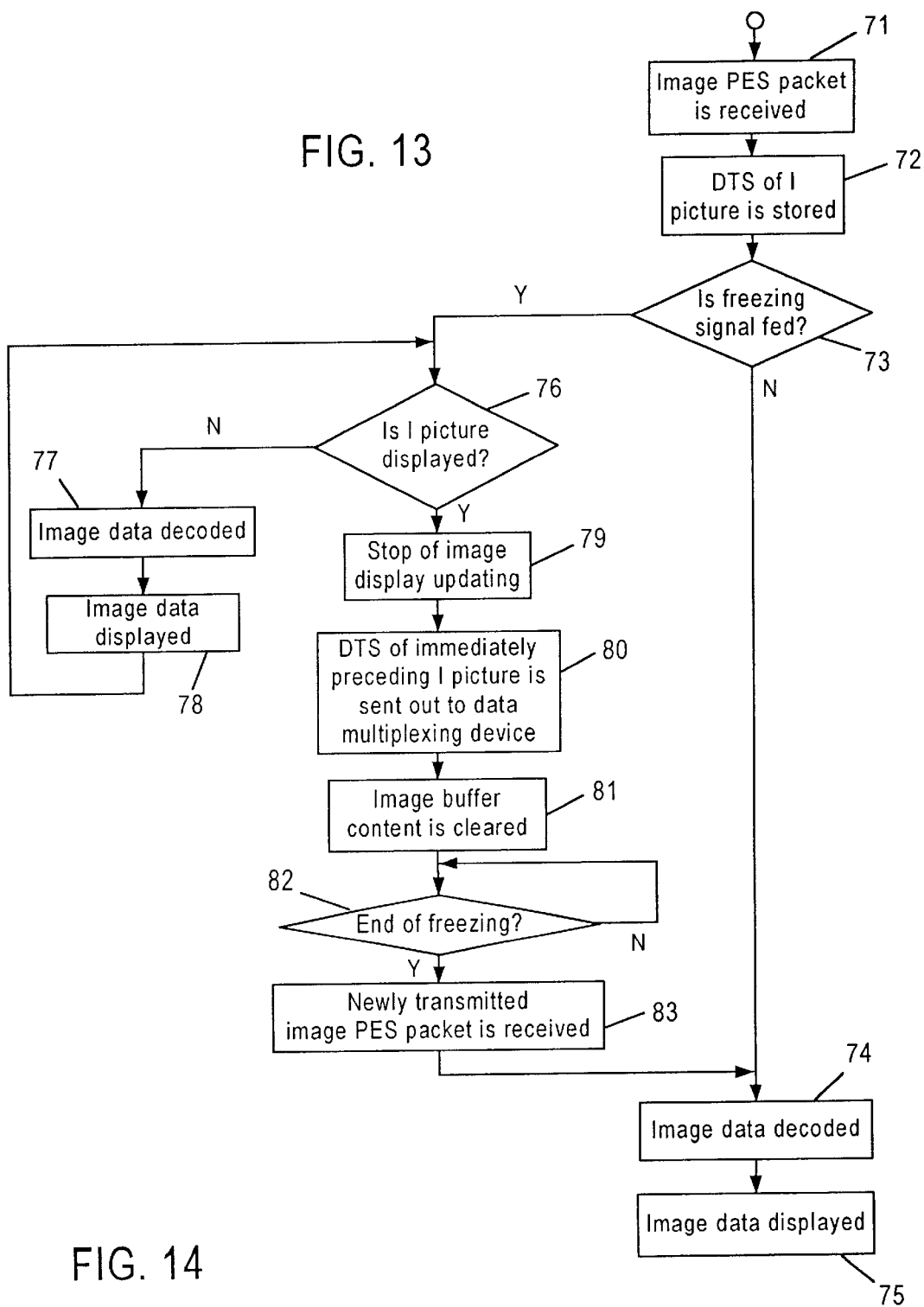
FIG. 13 is an explanatory diagram showing a multiplex data decoding method in a seventh embodiment of the invention.
Figure 14:
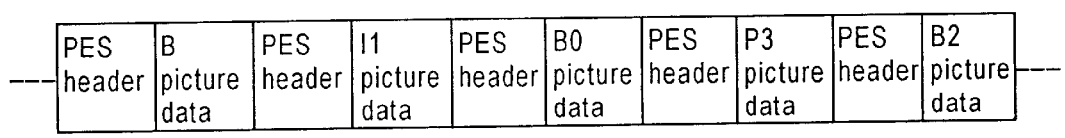
FIG. 14 is an explanatory diagram showing the content of multiplex data in the seventh embodiment of the invention.

FIG. 13 is an explanatory diagram showing a multiplex data decoding method in a seventh embodiment of the invention, and FIG. 14 is an explanatory diagram showing the content of multiplex data. The following explanation is made by reference to FIG. 13 and FIG. 14.

Of the multiplex data, herein, suppose the image data is composed of intra-frame or intra-field coded picture (I picture), forward predictive inter-frame or intra-field coded picture (P picture), and two-way predictive inter-frame or intra-field coded picture (B picture) as shown in FIG. 14.

Only I picture can be decoded by itself, whereas P picture cannot be decoded without the previously transmitted I picture, and B picture, without the previously transmitted I and P pictures.

In FIG. 14, successively to B picture, I1, B0, P3, and B2 are transmitted in this sequence. Decoding is done in the transmitting sequence, but the display is inverted in the sequence, that is, B0, I1, B2, and P3, ignoring the first B picture. When coding the image compressively in such technique, generally, the picture quality of I and P pictures is excellent, and it is known that the entire picture quality is higher when the picture quality of B picture is slightly impaired.

When freezing the image during trick play, from the above reason, a better picture quality is obtained by freezing in other pictures than B picture. When canceling the freeze, it is preferred to start from the same frame. When transmitting such data, it is generally possible to access randomly by inserting a sequence header before the I picture that can be decoded by itself. Therefore, access from the I picture, that is, resuming from freeze is relatively easy.

It is FIG. 13 that shows the above operation in the flowchart of CPU 2512 of the data decoding apparatus in FIG. 25. In FIG. 13, at 72, DTS (decoding time stamp: decoding time expressed by reference time PCR) of I picture is always stored. After input of freeze signal, at 76, it is checked if I picture is displayed or not, and when displayed, the image display updating is stopped to freeze the picture. Then, at 80, the DTS of the last stored I picture, that is, the I picture now frozen on screen is sent to the data multiplexing apparatus. In the multiplexing apparatus, on the basis of the DTS sent from the decoding apparatus, the I picture not frozen on screen is determined, and transmission is started from the I picture corresponding to the DTS upon end of freeze. In the decoding apparatus, the B picture existing between the I picture and the next first P picture cannot be decoded without I or P picture before the I picture, and hence the B picture is not decoded or displayed, and the operation is started by decoding and display of I picture. In this operation, without interruption from the frozen I picture, it is possible to reproduce continuously at the end of freeze.

Eighth Embodiment

Figure 15:
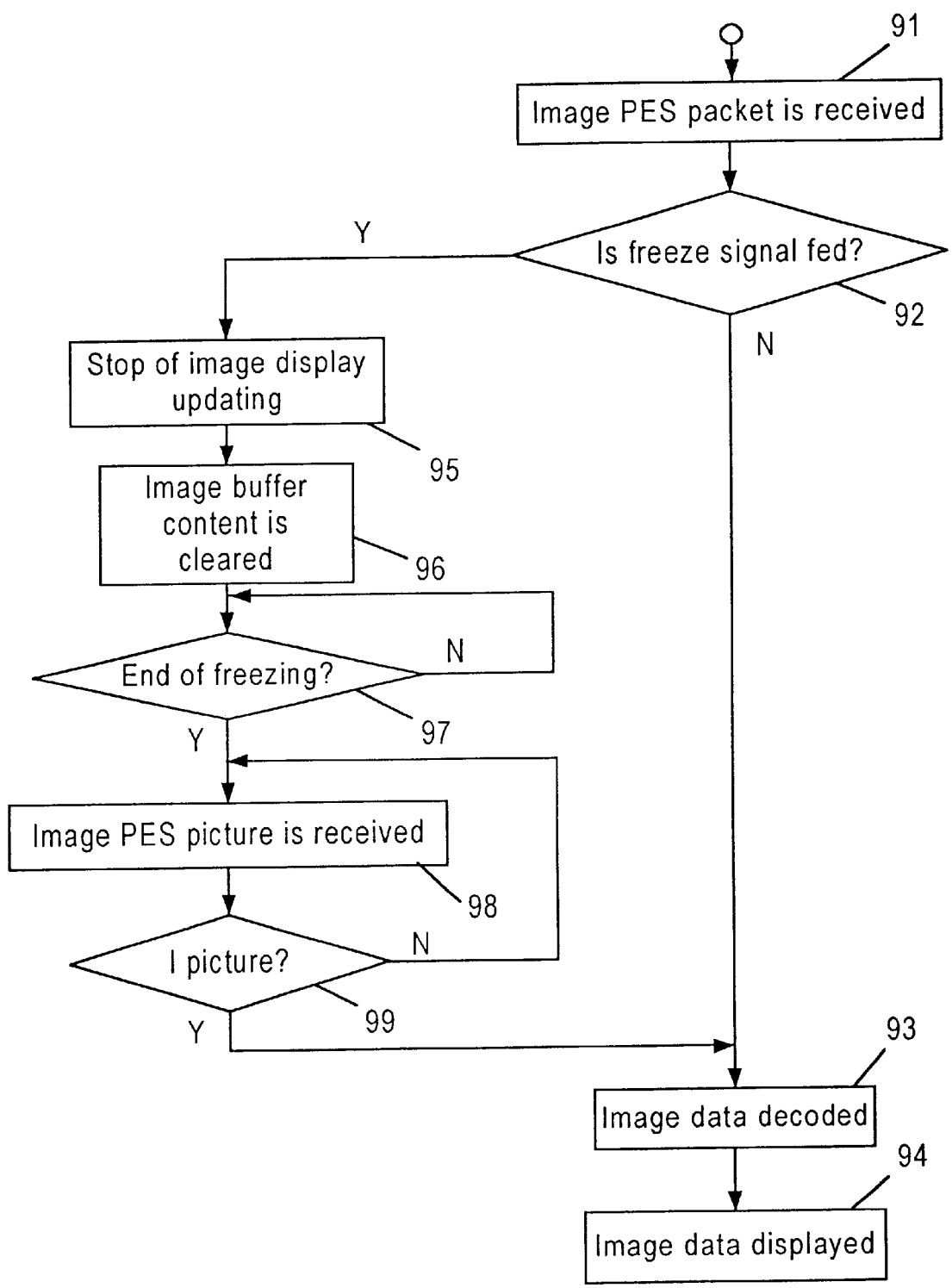
FIG. 15 is an explanatory diagram showing a multiplex data decoding method in an eighth embodiment of the invention.

FIG. 15 is an explanatory diagram showing a multiplex data decoding method in an eighth embodiment of the invention. What differs from the seventh embodiment is that the image being displayed at the present is displayed continuously, instead of updating the display at 95, when a freeze signal is entered at 92. At the end of freeze, the data being received at the present is analyzed, and decoding is resumed from I picture. According to; and embodiment, although it is impossible to reproduce from the same picture, it is not necessary to send DTS to the data multiplexing apparatus, so that the entire system can be constituted at low cost.

In this embodiment, it is intended to freeze in the image being displayed at the present, but, not limited to this, it may be also designed to freeze in the I picture as in the fourth embodiment.

Ninth Embodiment

Figure 16:
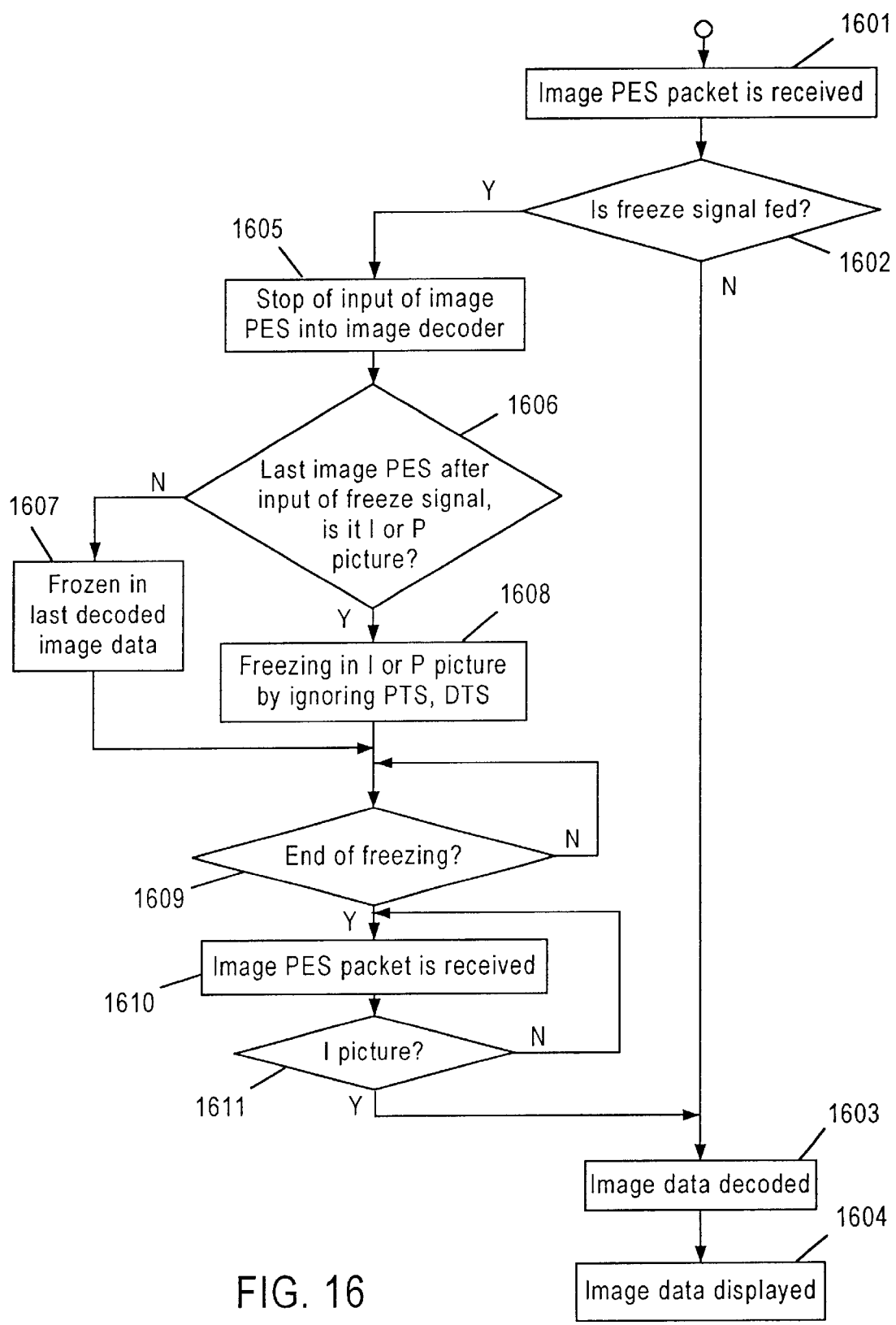
FIG. 16 is an explanatory diagram showing a multiplex data decoding method in a ninth embodiment of the invention.

FIG. 16 is an explanatory diagram showing a multiplex data decoding method in a ninth embodiment of the invention. What this embodiment differs from the seventh and eighth embodiments is that the display is not stopped at the time of input of freeze signal, but the input is stopped as indicated by 1605. Generally, an image decoder continues to display the last image that can be displayed when the input is no longer fed. Therefore, by stopping the input of the decoding apparatus, the image is frozen.

Besides, when the last image of input is I or P picture, the quality of the picture is excellent and hence it is preferred to use the picture as the still picture, but in the transmission sequence, there is no B picture succeeding I or P, that is, no B picture before I or P picture in the display sequence, therefore, without displaying the last I or P picture of input, the image is frozen in the B picture sent before.

In this embodiment, as in 1606, 1607, 1608 in FIG. 16, when the last input picture is I or P, ignoring the DTS showing the decoding time or the PTS showing the display time, the screen is frozen after displaying I or P picture.

In this operation, only by adding an input of the decoding apparatus, without adding new hardware in the display system, trick play of freezing is realized.

Tenth Embodiment

Figure 17:
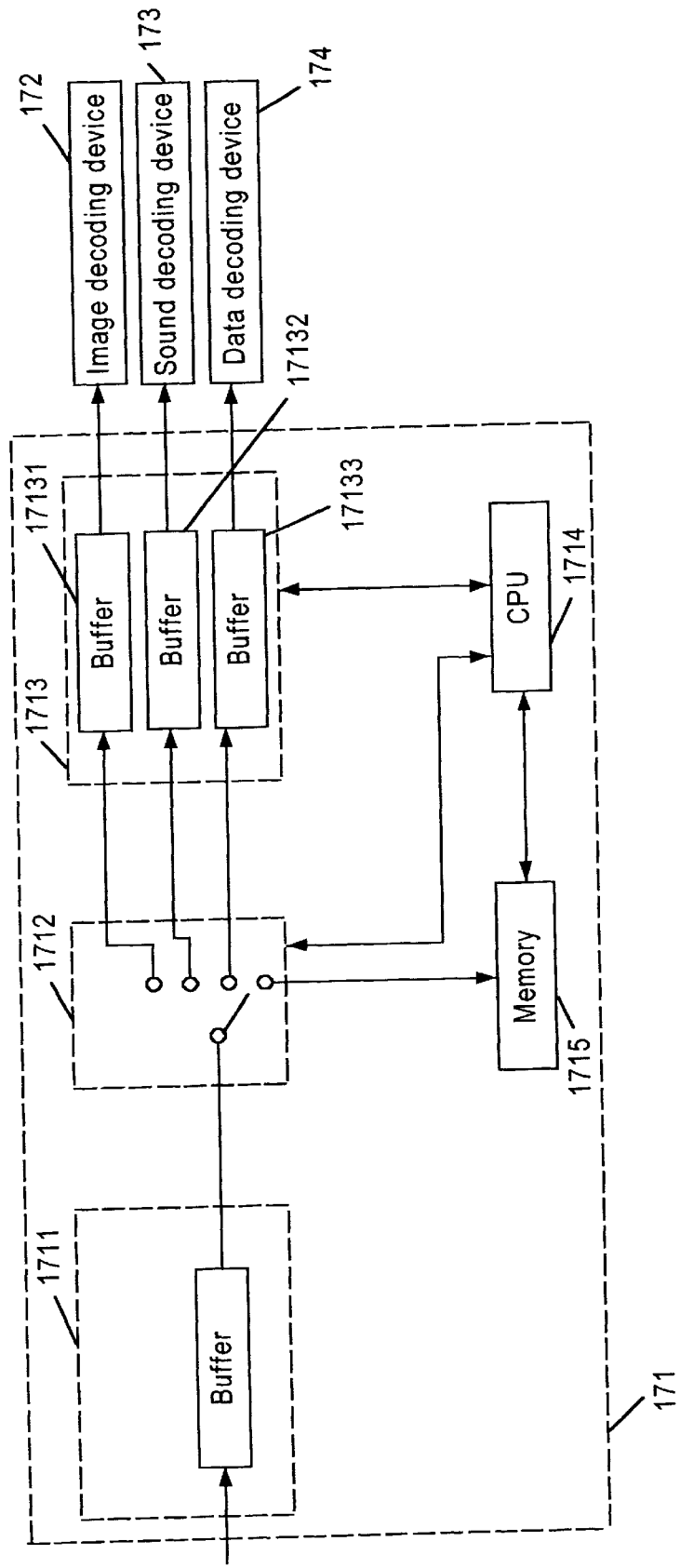
FIG. 17 is a block diagram of a multiplex data decoding apparatus in a tenth embodiment of the invention.
Figure 18:
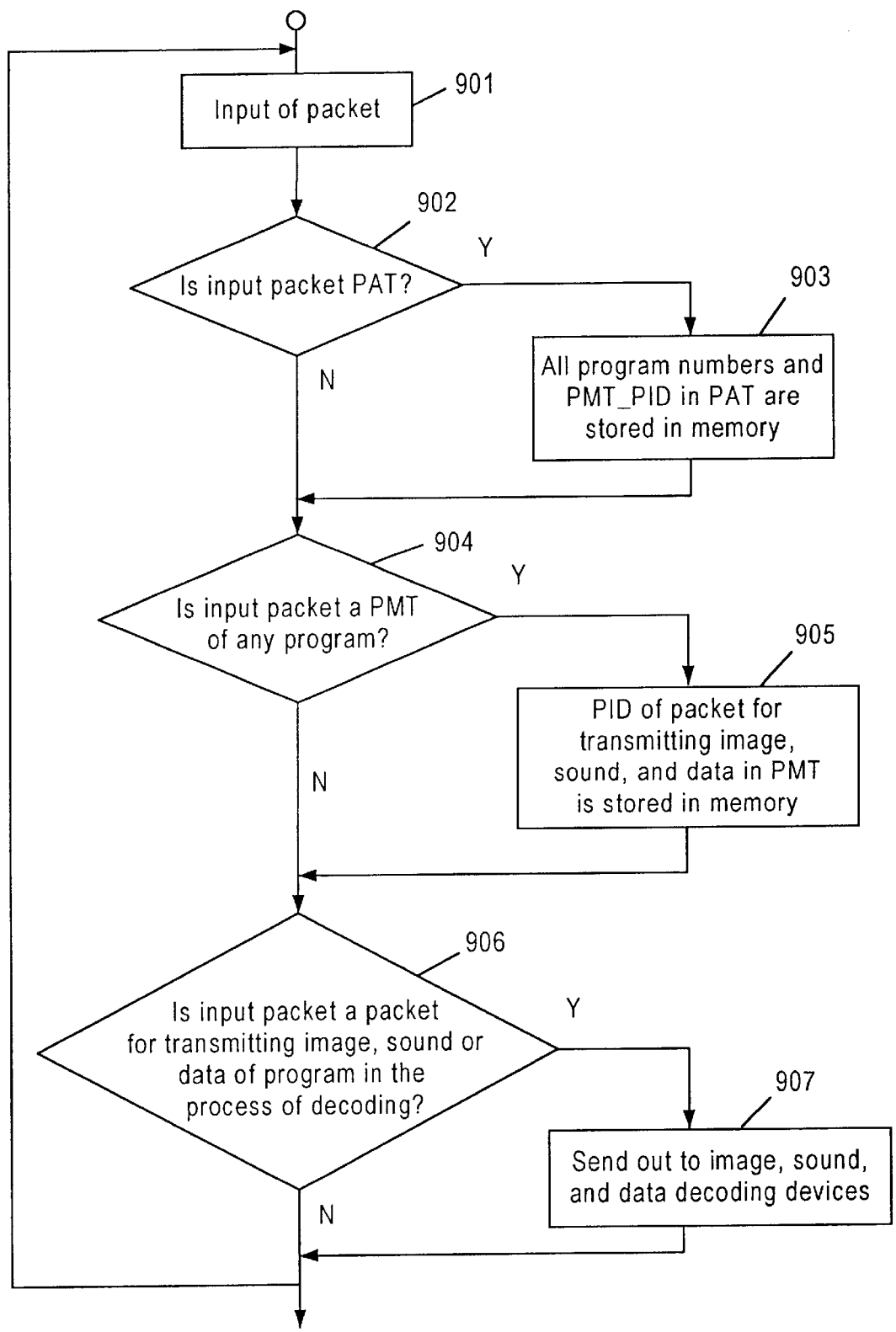
FIG. 18 is an explanatory diagram showing a multiplex data decoding method in the tenth embodiment of the invention.

FIG. 17 is an explanatory diagram of multiplex data decoding method and decoding apparatus in a tenth embodiment of the invention. In FIG. 17, reference numeral 171 is a multiplex data decoding apparatus, which is composed of an input unit 1711, a separating unit 1712, an output unit 1713, a CPU 1714, and a memory 1715. The output unit 1713 is composed of a first buffer 17131, a second buffer 17132, and a third buffer 17133. Reference numeral 172 is an image decoding device, 173 is a sound decoding device, and 174 is a data decoding device. FIG. 18 is a flowchart explaining the operation of the CPU 1714.

Thus constituted multiplex data decoding method and decoding apparatus are described below while referring to FIG. 17 and FIG. 18.

The input unit 1711 receives a packet row multiplexing at least one program composed of image, or sound or other data. In the multiplex packet row, the PMT describing the PID of image, sound or the like for composing the program as shown in prior art in FIG. 22 is multiplexed.

The separating unit 1712 stores all program numbers and PID of PMT described in PAT in the memory at step 903 as shown in flowchart in FIG. 18. Consequently, when the PMT of any program is entered at step 905, the PID for transmitting the image, sound or other data relating to that program is stored in the memory from the PMT. In the case of image, sound or other data of the program to be decoded, it is sent out to each output buffer at step 907.

Incidentally, when PAT or PMT is multiplexed at a specific frequency, and entered plural times, it is overwritten in the memory at every input. Or when the content of PAT or PMT is updated, the content of the memory is also updated. The image, sound, or other data entered in the output unit 1713 is put in each decoding device, and decoded, so that the program is reproduced.

Thus, according to the embodiment, when the program to be decoded is changed over, a table such as PAT and PMT can be acquired promptly, and therefore the time from changeover to display is shortened. Besides, the multiplex data decoding apparatus stores the other tables than the program to be decoded in the memory, and hence the multiplexing frequency of PAT and PMT can be decreased, so that data transmission of higher efficiency may be realized.

In the above embodiments, the PID of the image, sound, or other data other than the program to be decoded is extracted from the PMT and stored in the memory, but when other PMT than the program to be decoded is entered, it may be merely stored in the memory. One PMT is 1024 bytes or less at most according to the MPEG standard, and therefore at the processing capacity of the present CPU, there is no problem in searching PMT after changing over the program.

Thus, in the invention, since the discontinuity flag can be added to a proper packet, the operation of the decoding apparatus is not disturbed at all. Besides, since random access instruction code is always added to the image packet containing sequence start code, it is not necessary to search the sequence start code from the image data in the decoding apparatus.

Moreover, since the jitter of the reference time PCR is suppressed below a specific value, the operation of the decoding apparatus is not disturbed. When changing the program, PMT or PCR is sent out prior to the data of changed content, and hence the operation of the decoding apparatus is secure.

In trick play, still more, only the data of same picture is composed in PES packet and sent to the decoding apparatus, the image is not interrupted halfway. When freezing the image display, by freezing in the intra-frame coded picture, the time information of frozen picture is sent to the transmission device to retransmit from the image data of still picture, so that continuous image can be reproduced even after freezing.

In addition, the table packet of other than the program to be decoded is stored in the memory, and hence the operation from changeover of program to display can be done promptly.

What is claimed is:

1. A decoding method for decoding multiplexed data, said data comprising at least one program comprising at least image, sound, and other digital data, said method comprising the steps of:

receiving a first program map table (PMT) comprising information of a first program currently being decoded and a second program map table (PMT) comprising information of a second program not currently being decoded, said first and second program map table (PMT) having program identification data (PID) of image and sound data of the first program and the second program, respectively;

storing the first and second program map table (PMT) in a buffer memory;

feeding a TS packet comprising of at least one of image, sound, and other digital data of the first program to be decoded; and decoding and outputting said image, sound or other digital data.

2. A data decoding apparatus for decoding multiplexed data, said data comprising at least image, sound, and other digital data, said apparatus comprising:

an input block for receiving a packet row by multiplexing at least one program composed of at least one of sound, image, other digital data, and a first program map table (PMT) comprising information of a first program currently being decoded and a second program map table (PMT) comprising information of a second program not currently being decoded, said first and second program map table (PMT) having program identification data (PID) of image and sound data of the first program and the second program, respectively;

a memory for storing the first and second program map table (PMT) having information of the first program and the second program;

a separating block for selecting at least one program from the packet row, and for separating image, sound, or other digital data;

a CPU for controlling the separating block; and an output unit for outputting the separated data.

3. A method of displaying an image corresponding to a decoded picture, said method comprising the steps of:

decoding a picture which is compressed by either intra-frame compressive coding, intra-field compressive coding, inter-frame compressive coding or inter-field compressive coding;

receiving a freeze command signal;

stopping the decoding of the picture after decoding the intra-frame or intra-field picture following or proceeding the freeze command signal; and displaying the image corresponding to the decoded intra-frame or intra-field picture as a still picture.

4. A method of displaying an image corresponding to a decoded picture, said method comprising the steps of:

decoding a data packet comprising a picture which is compressed by either intra-frame compressive coding, intra-field compressive coding, inter-frame compressive coding, or inter-field compressive coding, and a flag showing a decoding or display time of the picture;

receiving a freeze command signal;

storing the flag showing the decoding or display time of the intra-frame or intra-field picture immediately before the received freeze command signal or immediately after the received freeze command signal;

sending the flag showing the decoding or display time of the intra-frame or intra-field picture to a multiplexing apparatus when resuming decoding after freezing;

displaying the image corresponding to the decoded intra-frame or intra-field picture identified by the flag as a still picture; and resuming decoding from the intra-frame or intra-field picture identified by the flag.

5. A method of displaying an image corresponding to a decoded picture, said method comprising the steps of:

decoding a picture which is compressed by either intra-frame compressive coding, intra-field compressive coding, inter-frame compressive coding or inter-field compressive coding;

receiving a freeze command signal;

stopping the input of the picture to a decoding apparatus when receiving the freeze command signal; and displaying an image corresponding to an intra-frame picture or an intra-field picture as a still picture, said intra-frame picture or an intra-field picture being input before receiving the freeze command signal.

6. A data decoding apparatus for displaying an image corresponding to a decoded picture, said apparatus comprising:

a decoder for decoding a picture which is compressed by either intra-frame compressive coding, intra-field compressive coding, inter-frame compressive coding or inter-field compressive coding; and a display for displaying an image corresponding to an I picture or a P picture before receiving the freeze command signal as a still picture.

* * * * *